(12) United States Patent
McKnight-MacNeil

(10) Patent No.: US 9,205,993 B2
(45) Date of Patent: Dec. 8, 2015

(54) TAKE-UP DRUM CARRIAGE ASSEMBLY FOR VEHICLE WASH CONVEYOR

(71) Applicant: Ryko Canada, Inc., Barrie (CA)

(72) Inventor: Ereth McKnight-MacNeil, Vars (CA)

(73) Assignee: Ryko Canada, Inc., Grimes, IA (US)

( * ) Notice: Subject to any disclaimer, the term of this patent is extended or adjusted under 35 U.S.C. 154(b) by 42 days.

(21) Appl. No.: 14/258,767

(22) Filed: Apr. 22, 2014

(65) Prior Publication Data

US 2014/0311875 A1 Oct. 23, 2014

Related U.S. Application Data

(60) Provisional application No. 61/814,623, filed on Apr. 22, 2013.

(51) Int. Cl.
B65G 23/44 (2006.01)
B60S 3/00 (2006.01)

(52) U.S. Cl.
CPC *B65G 23/44* (2013.01); *B60S 3/004* (2013.01)

(58) Field of Classification Search
CPC .............................. B65G 23/44; B60S 3/004
See application file for complete search history.

(56) References Cited

U.S. PATENT DOCUMENTS

| | | | | |
|---|---|---|---|---|
| 4,561,538 A | * | 12/1985 | Zwiebel | 198/816 |
| 5,022,514 A | * | 6/1991 | Lofberg | 198/813 |
| 6,267,228 B1 | * | 7/2001 | Cadwell et al. | 198/806 |
| 7,549,531 B2 | * | 6/2009 | Hosch et al. | 198/493 |
| 8,910,778 B1 | * | 12/2014 | Francisco et al. | 198/814 |

* cited by examiner

*Primary Examiner* — Gene Crawford
*Assistant Examiner* — Keith R Campbell
(74) *Attorney, Agent, or Firm* — Smart & Biggar

(57) ABSTRACT

A take-up drum carriage assembly may include a tensioning take-up drum, a carriage for supporting the tensioning take-up drum, a plurality of pivot arms for pivotably supporting the carriage relative to a vehicle wash conveyor frame, and for each of the pivot arms, at least one interconnector for pivotably interconnecting the pivot arm and the carriage. Each interconnector may include a resilient support that supports at least part of the weight of the carriage. The interconnector may fix the resilient support relative to one of the pivot arm and the carriage. The other of the pivot arm and the carriage may rock relative to, and against, the resilient support upon longitudinal movement of the carriage relative to the vehicle wash conveyor frame during tensioning. The pivot arms may be swing arms.

40 Claims, 13 Drawing Sheets

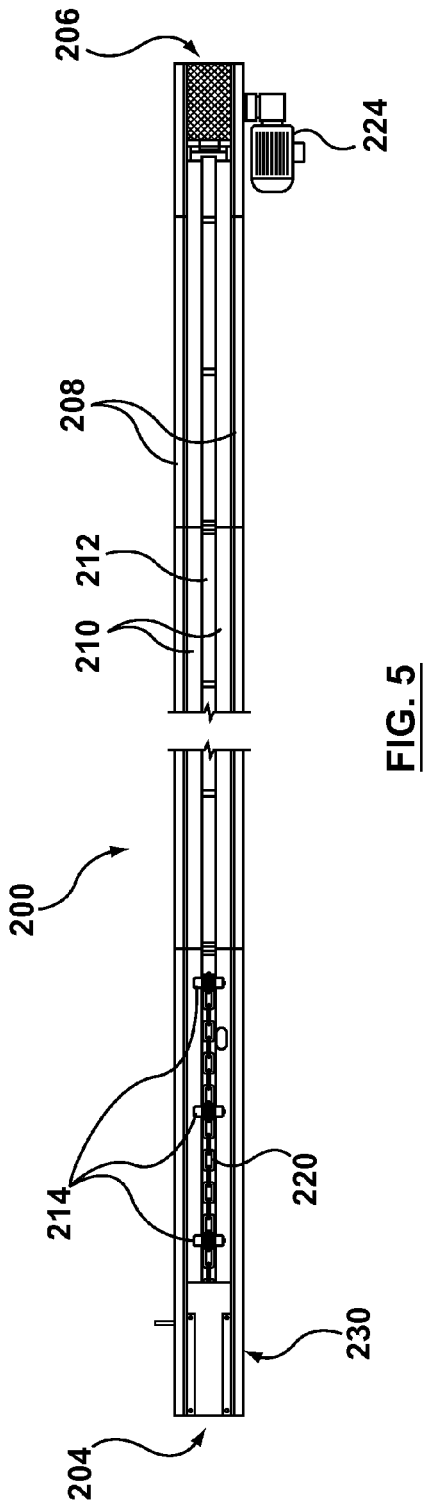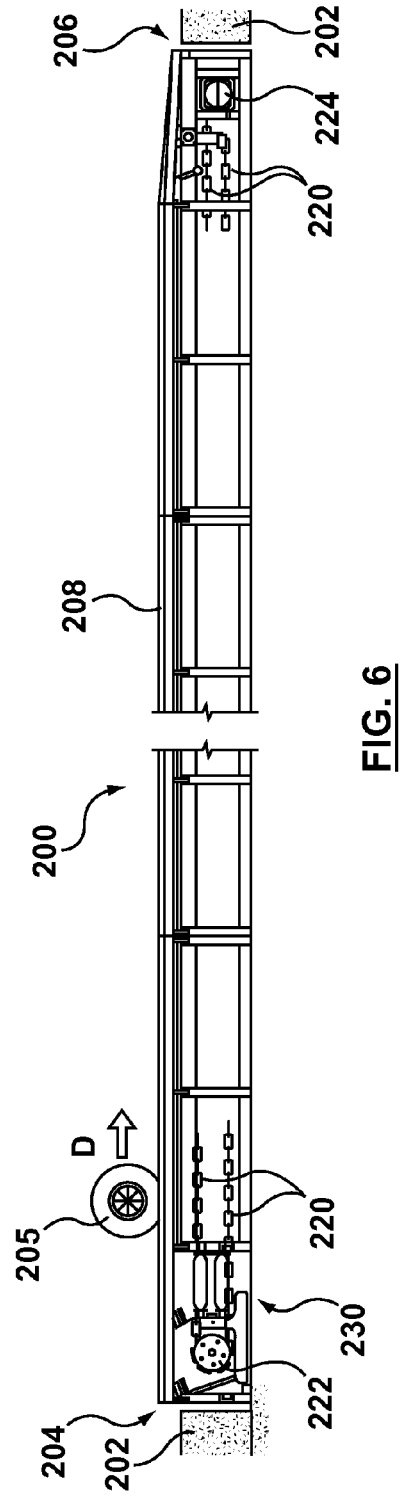

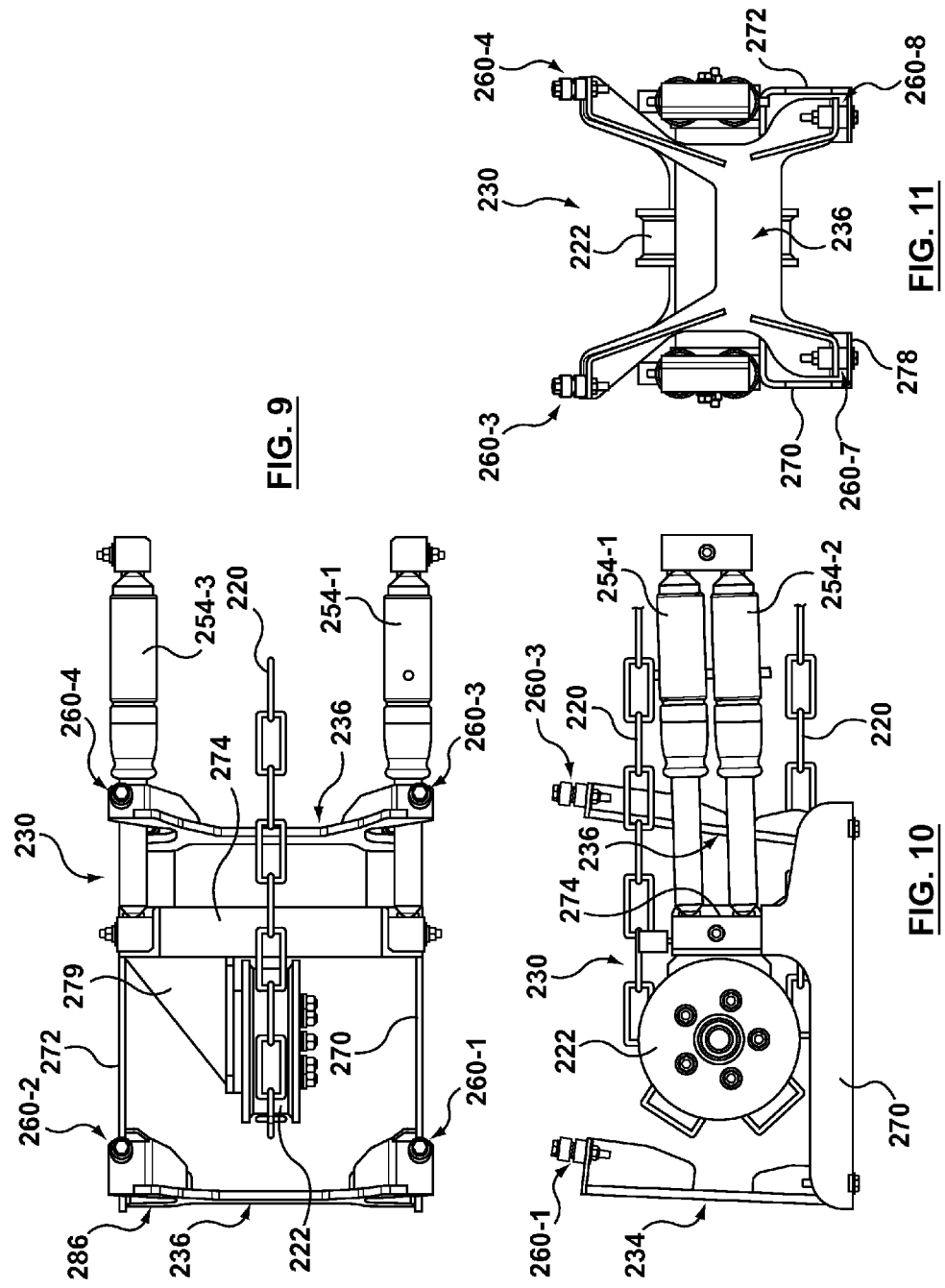

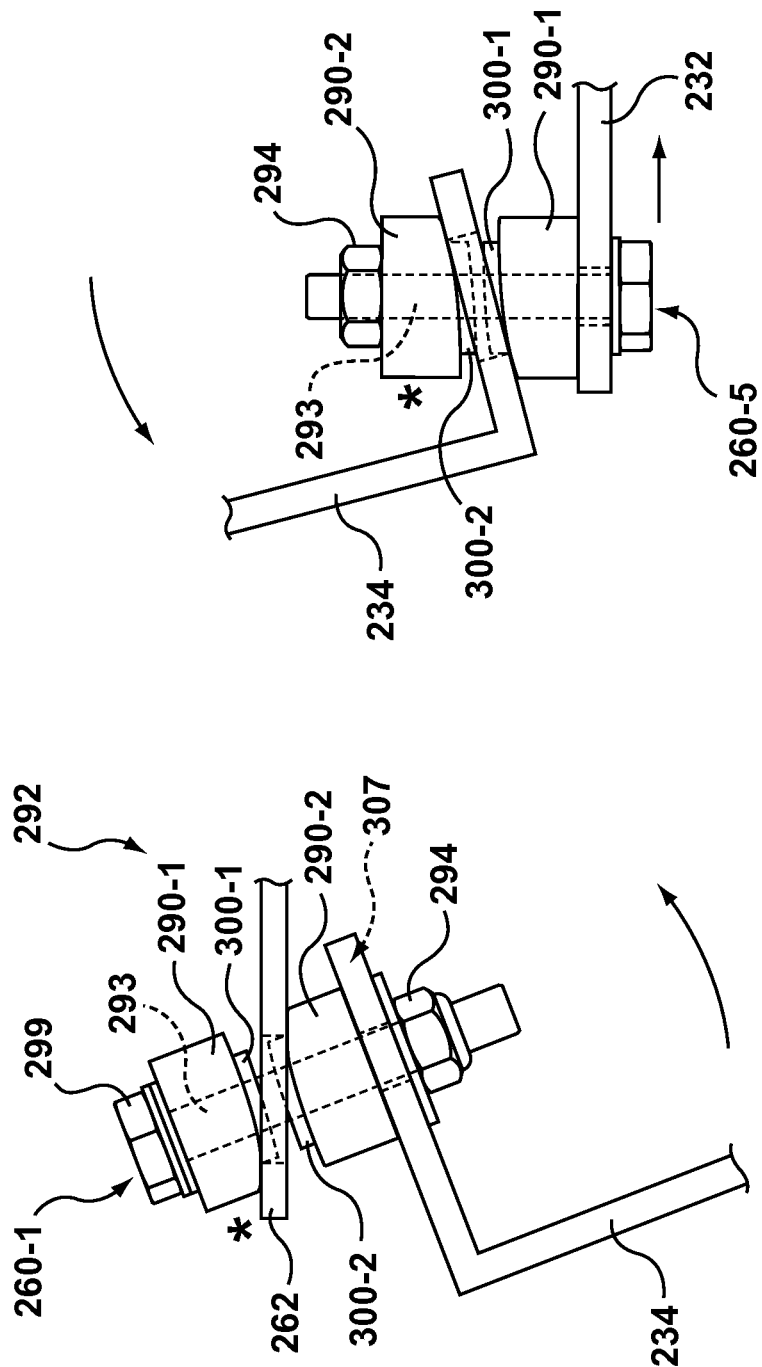

TAKE-UP DRUM CARRIAGE ASSEMBLY FOR VEHICLE WASH CONVEYOR

CROSS-REFERENCE TO RELATED APPLICATION

This application claims priority from U.S. provisional application No. 61/814,623 filed Apr. 22, 2013, the contents of which are hereby incorporated herein by reference.

FIELD OF TECHNOLOGY

The present disclosure relates to vehicle wash systems, and in particular to a take-up drum carriage assembly for a vehicle wash conveyor.

BACKGROUND

In a tunnel type vehicle wash system, a conveyor may be used to convey a vehicle through various wash stations, such as a pre-soak station, a soap dispenser, a tire washing station, a sprayer station, one or more rotating brushes, a pre-rinse station, a wax applicator station, a rinsing device, and/or a drying station for example. The conveyor may comprise an elongate track flanked by a pair of rails which act as a tire guide. A tire of a vehicle may be pushed along the track, within the tire guide (i.e. between the rails), by a longitudinally advancing roller to cause the vehicle to roll forwardly from the entrance end to the exit end of the conveyor. The roller may be driven by an endless drive, such as a chain or belt.

The endless drive of the conveyor may extend between a sprocket at an exit end of the conveyor and a freely rotating take-up drum at an entrance end of the conveyor. The sprocket and drum are typically situated below a track level of the conveyor. The sprocket may be rotatably driven by an electric motor for example to cause the endless drive to move.

Tensioning of the endless drive may be achieved through a biasing of the take-up drum away from the sprocket. For example, the take-up drum may be mounted onto a take-up drum carriage (or simply "drum carriage") that is free to slide, on slide rails or shafts, longitudinally with respect to, and in alignment with, the endless drive. The slidable drum carriage may be biased away from the sprocket using biasing means. The biasing means may for example be gas springs, which may have the appearance of shock absorbers.

Should the endless drive slacken, e.g. due lengthening of the drive over its usable lifetime, the gas springs may automatically extend so as to slide the drum carriage away from the sprocket in order to take up the slack. Should the endless drive tighten, e.g. due to sudden increased loading of the forward-moving portion of the endless drive when a roller engages a vehicle tire entering the conveyor, the increased tension on the forward moving-portion of the drive may exceed the biasing force of the gas springs, causing them to compress. In this case, the drum carriage may slide towards the sprocket and thereby reduce the tension on the endless drive to an acceptable level.

SUMMARY

In one aspect of the present disclosure, there is provided a take-up drum carriage assembly for facilitating tensioning of an endless drive of a vehicle wash conveyor, the take-up drum carriage assembly comprising: a tensioning take-up drum; a carriage for supporting the tensioning take-up drum; a plurality of swing arms for swingably suspending the carriage from a vehicle wash conveyor frame; and for each of the swing arms: at least one interconnector for pivotably interconnecting the swing arm and the carriage, each interconnector comprising a resilient support that supports at least part of the weight of the carriage, the interconnector fixing the resilient support relative to one of the swing arm and the carriage, wherein the other of the swing arm and the carriage rocks relative to, and against, the resilient support upon a swinging of the carriage relative to the vehicle wash conveyor frame during tensioning.

In some embodiments, each interconnector interconnecting one of the swing arms and the carriage further comprises a resilient spacer between the swing arm and the carriage.

In some embodiments, a portion of said one of the swing arms is sandwiched between the resilient support and the resilient spacer.

In some embodiments, a portion of the carriage is sandwiched between the resilient support and the resilient spacer.

In some embodiments, each interconnector comprises a fastener having a shaft and two ends wider than the shaft, the resilient support, the swing arm and the carriage each have a hole therethrough, and the shaft of the fastener extends through the holes in each of the resilient support, the swing arm and the carriage.

In some embodiments, the resilient support is situated between one of the ends of the fastener and the swing arm.

In some embodiments, the resilient support is situated between one of the ends the fastener and the carriage.

In some embodiments, each interconnector interconnecting one of the swing arms and the carriage further comprises a resilient spacer with a hole therethrough, the shaft of the fastener extending through the hole in the resilient spacer, the resilient spacer being situated between the swing arm and the carriage.

In some embodiments, the resilient support has a neck portion and a body portion, the neck portion being narrower than the body portion, and the hole in the resilient support extends through the neck portion, such that, when the neck portion is seated either in the hole of the swing arm or in the hole of the carriage, the neck portion acts as a spacer between: the periphery of the hole in which the neck portion is seated; and the shaft of the fastener extending through the hole in the resilient support.

In some embodiments, the plurality of swing arms is a pair of swing arms, the first swing arm of the pair being pivotably connected to one end of the carriage, the second swing arm being pivotably connected to the other end of the carriage, such that the carriage maintains a substantially horizontal orientation upon a swinging of the carriage from the pair of swing arms.

In another aspect of the present disclosure, there is provided a take-up drum carriage assembly for facilitating tensioning of an endless drive of a vehicle wash conveyor, the take-up drum carriage assembly comprising: a tensioning take-up drum; a carriage for supporting the tensioning take-up drum; a plurality of swing arms for swingably suspending the carriage from a vehicle wash conveyor frame; and for each of the swing arms: at least one interconnector for pivotably interconnecting the swing arm to the vehicle wash conveyor frame, each interconnector comprising a resilient support that supports at least part of the weight of the swing arm, the interconnector fixing the resilient support relative to one of the swing arm and the vehicle wash conveyor frame, wherein the resilient support rocks relative to and against the other of the swing arm and the vehicle wash conveyor frame upon swinging of the swing arm during tensioning.

In some embodiments, each interconnector interconnecting one of the swing arms to the vehicle wash conveyor further comprises a resilient spacer between the swing arm and the vehicle wash conveyor.

In some embodiments, a portion of said one of the swing arms is sandwiched between the resilient support and the resilient spacer.

In some embodiments, a portion of the vehicle wash conveyor frame is sandwiched between the resilient support and the resilient spacer.

In some embodiments, each interconnector comprises a fastener having a shaft and two ends wider than the shaft, the resilient support, the swing arm and the carriage each have a hole therethrough, and the shaft of the fastener extends through the holes in each of the resilient support, the swing arm and the vehicle wash conveyor frame.

In some embodiments, the resilient support is situated between one of the ends of the fastener and the swing arm.

In some embodiments, the resilient support is situated between one of the ends the fastener and the vehicle wash conveyor frame.

In some embodiments, each interconnector interconnecting one of the swing arms and the vehicle wash conveyor frame further comprises a resilient spacer with a hole therethrough, the shaft of the fastener extending through the hole in the resilient spacer, the resilient spacer being situated between the swing arm and the vehicle wash conveyor frame.

In some embodiments, the resilient support has a neck portion and a body portion, the neck portion being narrower than the body portion, and the hole in the resilient support extends through the neck portion, such that, when the neck portion is seated either in the hole of the swing arm or in the hole of the vehicle wash conveyor frame, the neck portion acts as a spacer between: the periphery of the hole in which the neck portion is seated; and the shaft of the fastener extending through the hole in the resilient support.

In some embodiments, the at least one interconnector for pivotably interconnecting each swing arm to the vehicle wash conveyor frame comprises two interconnectors pivotably connecting the swing arm to the vehicle wash conveyor frame at two respective points on the vehicle wash conveyor frame that are transversely spaced apart from one another, such that each swing arm is swingable longitudinally with respect to the vehicle wash conveyor frame but is not swingable transversely with respect to the vehicle wash conveyor frame.

In another aspect of the present disclosure, there is provided a take-up drum carriage assembly for facilitating tensioning of an endless drive of a vehicle wash conveyor, the take-up drum carriage assembly comprising: a tensioning take-up drum; a carriage for supporting the tensioning take-up drum; a plurality of pivot arms for pivotably supporting the carriage relative to a vehicle wash conveyor frame; and for each of the pivot arms: at least one interconnector for pivotably interconnecting the pivot arm and the carriage, each interconnector comprising a resilient support that supports at least part of the weight of the carriage, the interconnector fixing the resilient support relative to one of the pivot arm and the carriage, wherein the other of the pivot arm and the carriage rocks relative to, and against, the resilient support upon longitudinal movement of the carriage relative to the vehicle wash conveyor frame during tensioning.

In some embodiments, each interconnector interconnecting one of the pivot arms and the carriage further comprises a resilient spacer between the pivot arm and the carriage.

In some embodiments, a portion of said one of the pivot arms is sandwiched between the resilient support and the resilient spacer.

In some embodiments, a portion of the carriage is sandwiched between the resilient support and the resilient spacer.

In some embodiments, each interconnector comprises a fastener having a shaft and two ends wider than the shaft, the resilient support, the pivot arm and the carriage each have a hole therethrough, and the shaft of the fastener extends through the holes in each of the resilient support, the pivot arm and the carriage.

In some embodiments, the resilient support is situated between one of the ends of the fastener and the pivot arm.

In some embodiments, the resilient support is situated between one of the ends the fastener and the carriage.

In some embodiments, each interconnector interconnecting one of the pivot arms and the carriage further comprises a resilient spacer with a hole therethrough, the shaft of the fastener extending through the hole in the resilient spacer, the resilient spacer being situated between the pivot arm and the carriage.

In some embodiments, the resilient support has a neck portion and a body portion, the neck portion being narrower than the body portion, and the hole in the resilient support extends through the neck portion, such that, when the neck portion is seated either in the hole of the pivot arm or in the hole of the carriage, the neck portion acts as a spacer between: the periphery of the hole in which the neck portion is seated; and the shaft of the fastener extending through the hole in the resilient support.

In some embodiments, the plurality of pivot arms is a pair of pivot arms, the first pivot arm of the pair being pivotably connected to one end of the carriage, the second pivot arm being pivotably connected to the other end of the carriage, such that the carriage maintains a substantially horizontal orientation upon a swinging of the carriage from the pair of pivot arms.

In another aspect of the present disclosure, there is provided a take-up drum carriage assembly for facilitating tensioning of an endless drive of a vehicle wash conveyor, the take-up drum carriage assembly comprising: a tensioning take-up drum; a carriage for supporting the tensioning take-up drum; a plurality of pivot arms for pivotably supporting the carriage relative to a vehicle wash conveyor frame; and for each of the pivot arms: at least one interconnector for pivotably interconnecting the pivot arm to the vehicle wash conveyor frame, each interconnector comprising a resilient support that supports at least part of the weight of the pivot arm, the interconnector fixing the resilient support relative to one of the pivot arm and the vehicle wash conveyor frame, wherein the resilient support rocks relative to and against the other of the pivot arm and the vehicle wash conveyor frame upon pivoting of the pivot arm during tensioning.

In some embodiments, each interconnector interconnecting one of the pivot arms to the vehicle wash conveyor further comprises a resilient spacer between the pivot arm and the vehicle wash conveyor.

In some embodiments, a portion of said one of the pivot arms is sandwiched between the resilient support and the resilient spacer.

In some embodiments, a portion of the vehicle wash conveyor frame is sandwiched between the resilient support and the resilient spacer.

In some embodiments, each interconnector comprises a fastener having a shaft and two ends wider than the shaft, the resilient support, the pivot arm and the carriage each have a hole therethrough, and the shaft of the fastener extends through the holes in each of the resilient support, the pivot arm and the vehicle wash conveyor frame.

In some embodiments, the resilient support is situated between one of the ends of the fastener and the pivot arm.

In some embodiments, the resilient support is situated between one of the ends the fastener and the vehicle wash conveyor frame.

In some embodiments, each interconnector interconnecting one of the pivot arms and the vehicle wash conveyor frame further comprises a resilient spacer with a hole therethrough, the shaft of the fastener extending through the hole in the resilient spacer, the resilient spacer being situated between the pivot arm and the vehicle wash conveyor frame.

In some embodiments, the resilient support has a neck portion and a body portion, the neck portion being narrower than the body portion, and the hole in the resilient support extends through the neck portion, such that, when the neck portion is seated either in the hole of the pivot arm or in the hole of the vehicle wash conveyor frame, the neck portion acts as a spacer between: the periphery of the hole in which the neck portion is seated; and the shaft of the fastener extending through the hole in the resilient support.

In some embodiments, the at least one interconnector for pivotably interconnecting each pivot arm to the vehicle wash conveyor frame comprises two interconnectors pivotably connecting the pivot arm to the vehicle wash conveyor frame at two respective points on the vehicle wash conveyor frame that are transversely spaced apart from one another, such that each pivot arm is swingable longitudinally with respect to the vehicle wash conveyor frame but is not swingable transversely with respect to the vehicle wash conveyor frame.

BRIEF DESCRIPTION OF THE DRAWINGS

In the figures which illustrate by way of example only, embodiments of the present disclosure:

FIG. 5 is a plan view of a conveyor of a vehicle wash system;

FIG. 6 is a side elevation view of the conveyor of FIG. 5;

FIG. 9 is a bottom view of the take-up drum carriage assembly FIG. 8;

FIG. 10 is a side elevation view of the take-up drum carriage assembly FIG. 8;

FIG. 11 is a front elevation view of the take-up drum carriage assembly FIG. 8;

FIGS. 17 and 18 are close-up side elevation views of interconnectors used in conjunction with the take-up drum carriage assembly shown in FIG. 16.

DETAILED DESCRIPTION

Figure 1:
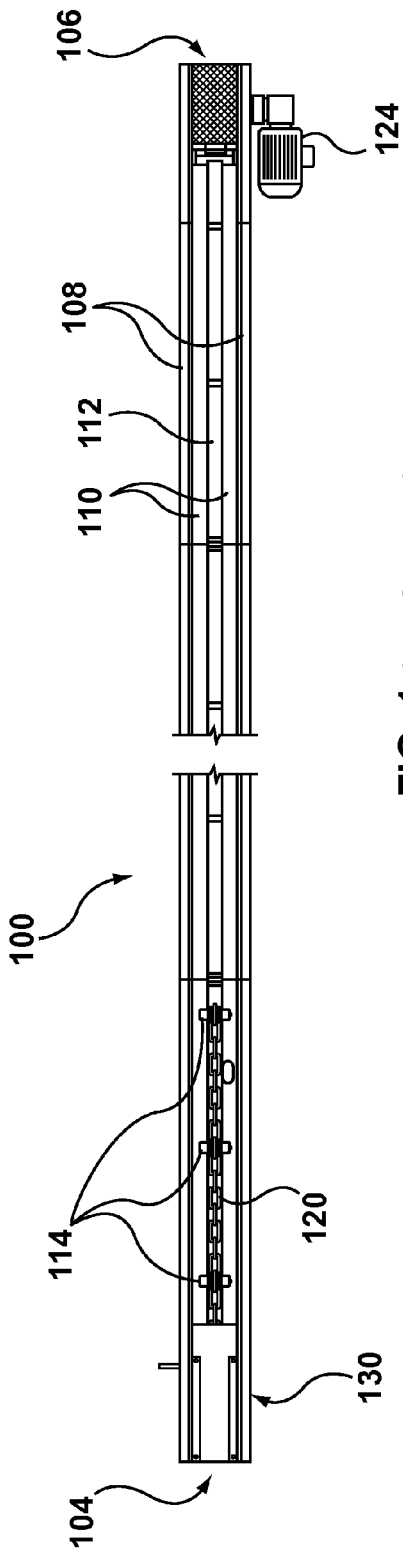
FIG. 1 is a plan view of a known conveyor of a vehicle wash system.
Figure 2:
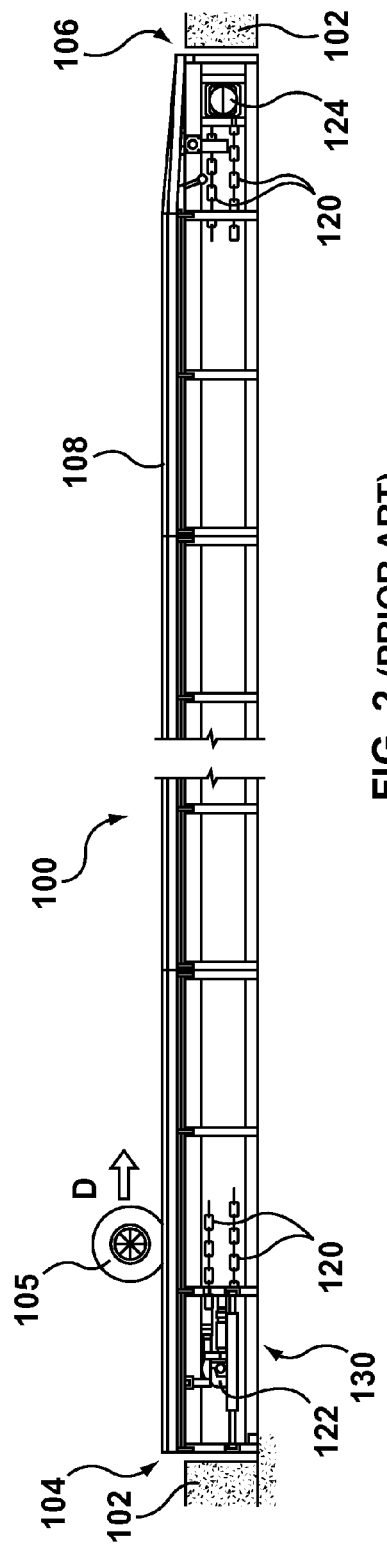
FIG. 2 is a side elevation view of the known conveyor of FIG. 1.

With reference to FIGS. 1 and 2, a known conveyor 100 for use in a tunnel type vehicle wash system is illustrated in top plan view and in side elevation view, respectively. Conveyor 100 is designed to convey a vehicle through various wash stations within a vehicle wash tunnel. The conveyor 100 may be substantially embedded within a floor 102 (see FIG. 2) of the tunnel when installed.

Conveyor 100 has an entrance end 104 into which a tire 105 of a vehicle to be washed enters the conveyor and an exit end 106 from which the tire of the washed vehicle exits the conveyor. A pair of upstanding rails 108 form a tire guide within which the vehicle tire rolls as it is conveyed downstream (forwardly, i.e. in direction D—see FIG. 2). A slotted track 110 (FIG. 1) provides a flat surface upon which the vehicle tire rolls. A series of rollers 114 is used to push vehicle tires downstream along the length of the conveyor 100, from the entrance end 104 to the exit end 106.

The rollers 114 are driven by an endless drive 120, to which the rollers are attached via upstanding tabs (not expressly shown) protruding through longitudinal slot 112 in track 110. The endless drive 120 may for example be an endless chain having rigid links pivotably interconnected with pins. It is situated below track level, i.e. below the level of track 110, in the present embodiment. The endless drive extends along substantially the entire length of the conveyor 100 between a sprocket (not expressly illustrated) at the exit end 106 and a freely rotating take-up drum at the entrance end 104. The sprocket and drum are also situated below track level in the present embodiment. The sprocket is rotatably driven by electric motor 124 to cause the endless drive 120 to move. The electric motor 124 may be selectively activated, e.g. when a vehicle is detected at the entrance end 104 of the conveyor 100.

The conveyor 100 comprises take-up drum carriage assembly 130 that is intended to keep the tension of the endless drive 120 within an acceptable or desired range. This is to avoid a situation in which the endless drive 120 is too slack, in which case the endless drive could fall off the sprocket and therefore cease to move, or too tight, in which case the strain on the endless drive or motor may exceed desirable levels. In the illustrated embodiment, the take-up drum carriage assembly 130 is situated at the entrance end 104 of the conveyor, below track level. The take-up drum carriage assembly 130 is illustrated in greater detail in FIGS. 3 and 4.

Figure 3:
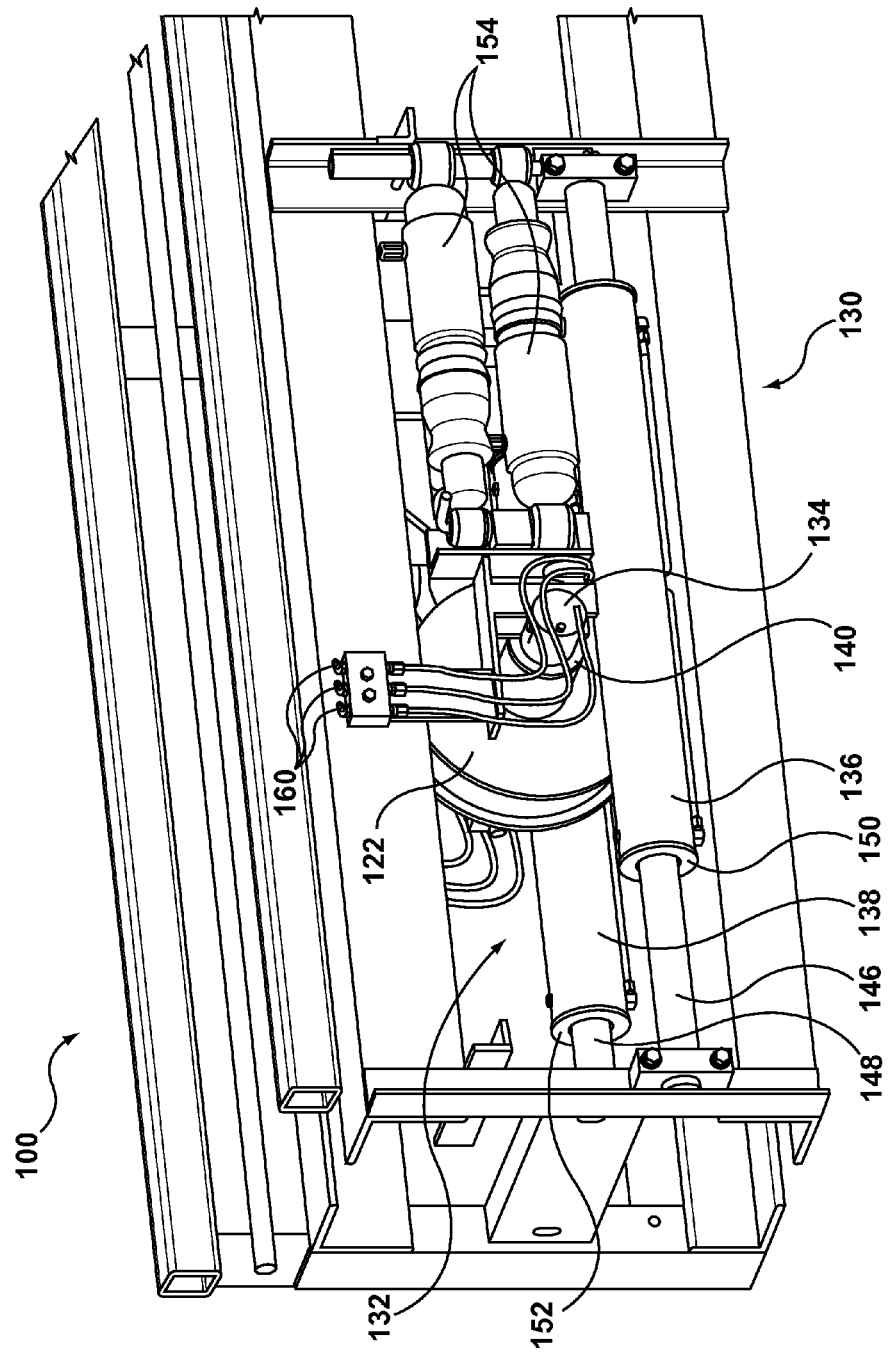
FIG. 3 is a perspective view of a portion of the known conveyor of FIG. 1 containing a take-up drum carriage used for tensioning an endless drive.
Figure 4:
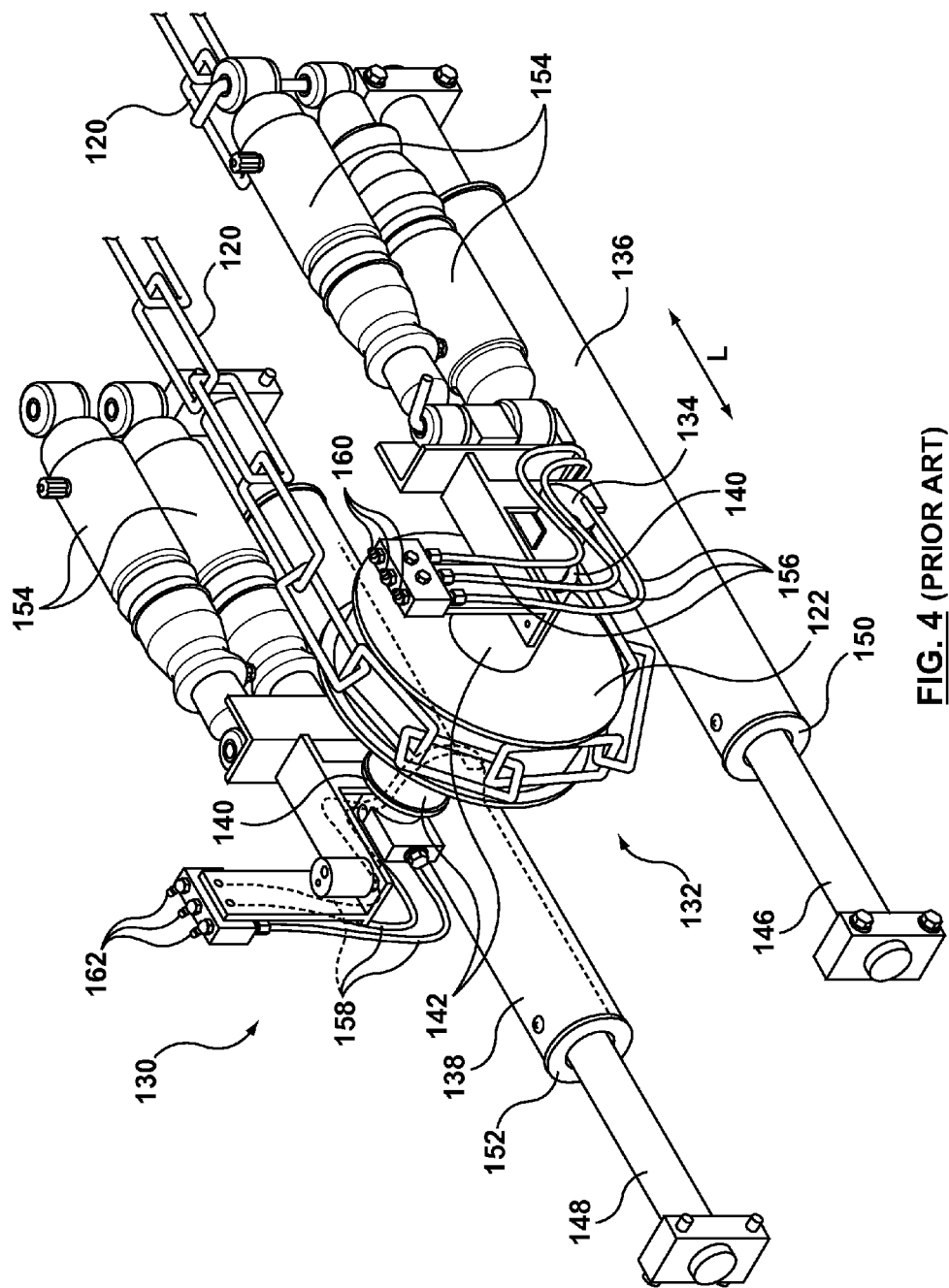
FIG. 4 is a perspective view of the take-up drum carriage FIG. 3 in isolation from the conveyor of FIGS. 1 and 2.

Referring to FIGS. 3 and 4, it can be seen that known take-up drum carriage assembly 130 includes a take-up drum 122 mounted onto a drum carriage 132. The role of the drum carriage 132 is to carry the drum 122 in such a way that the drum 122 is longitudinally movable for tensioning purposes. The illustrated drum carriage comprises a fixed shaft 134 mounted transversely to a pair of parallel slider tubes 136, 138. The shaft 134 acts as an axle about which the drum 122 freely rotates. Rotation is facilitated by a tubular bushing 140 contained within a tubular housing 142 that is attached to the drum 122.

The slider tubes 136, 138 are designed to slide longitudinally (i.e. in direction Las shown in FIG. 4) upon respective slider shafts 146, 148, which are fixedly mounted to a frame of the conveyor 100 and which also form part of the assembly 130. Sliding is facilitated by tubular bushings 150,152.

Tensioning of the endless drive 120 (see FIG. 4) is achieved through a biasing of the take-up drum 122 away from the sprocket. In particular, the drum carriage 132 upon which the take-up drum 122 is carried is biased away from the sprocket using gas springs 154 mounted between the carriage 132 and the frame of conveyor 100. When endless drive 120 slackens, e.g. due lengthening of the drive over its usable lifetime, the gas springs 154 will automatically extend so as to slide the drum carriage on the slider shafts 146, 148 away from the sprocket (i.e. away from the exit end 106 of the conveyor of FIG. 2) in order to take up the slack. Should the endless drive 120 tighten such that the biasing force of the gas springs 154 is exceeded, the gas springs 154 will compress and the drum carriage 132 will slide on the slider shafts 146, 148 in the opposite direction, i.e. towards the sprocket, to reduce the tension on the endless drive 122.

The take-up drum carriage assembly 130 includes two sets 156, 158 of grease hoses terminated by respective fittings 160, 162. These are used to periodically grease the moving parts of the take-up drum carriage assembly 130 as part of routine maintenance. Greasing may entail ceasing operation of the conveyor 100 and removing access plates or panels to access the fittings 160, 162. Even with such routine maintenance, the bushings 150, 152 and/or slider shafts 146, 148 may wear over time, e.g. due to an accumulation of grit or debris on weight-bearing surfaces of moving parts that repeatedly slide against one another during normal use of the vehicle wash tunnel. When the moving parts become significantly worn, they may require replacement.

Referring to FIGS. 5 and 6, a different conveyor 200 for use in a tunnel type vehicle wash system is illustrated in top plan view and in side elevation view, respectively. The conveyor 200 is similar in many respects to known conveyor 100 of FIGS. 1-4 but uses a different take-up drum carriage assembly 230 to maintain a tension of the endless drive 220. As will be appreciated, the take-up drum carriage assembly 230 may require less regular maintenance than the above-described assembly 130 and is designed so as to limit the wear of weight-bearing moving parts over time.

Like conveyor 100, conveyor 200 is designed to convey a vehicle through various wash stations within a vehicle wash tunnel, such as a pre-soak station, a soap dispenser, a tire washing station, a sprayer station, one or more rotating brushes, a pre-rinse station, a wax applicator station, a rinsing device, and/or a drying station for example. The conveyor 200 may similarly be substantially embedded within a floor 202 (see FIG. 6) of the tunnel when installed.

Conveyor 200 has an entrance end 204 into which a tire 205 of a vehicle to be washed enters the conveyor and an exit end 206 from which the tire of the washed vehicle exits the conveyor. A pair of upstanding rails 208 form a tire guide within which the vehicle tire rolls as it is conveyed forwardly in downstream direction D (see FIG. 6). A slotted track 210 (FIG. 5) provides a flat surface upon which the vehicle tire rolls. A series of rollers 214 is used to push vehicle tires downstream along the length of the conveyor 200.

The rollers 214 are driven by an endless drive 220, to which the rollers are attached via upstanding tabs (not expressly shown) protruding through longitudinal slot 212 in track 210.

The endless drive 220 may for example be an endless chain having rigid links pivotably interconnected with pins. It is situated below track level, i.e. below the level of track 210, in the present embodiment. The endless drive extends along substantially the entire length of the conveyor 200 between a sprocket (not expressly illustrated) at the exit end 206 and a freely rotating take-up drum at the entrance end 204. The sprocket and drum are also situated below track level in the present embodiment. The sprocket is rotatably driven by electric motor 224 to cause the endless drive 220 to move. The electric motor 224 may be selectively activated, e.g. when a vehicle is detected at the entrance end 204 of the conveyor 200.

Figure 7:
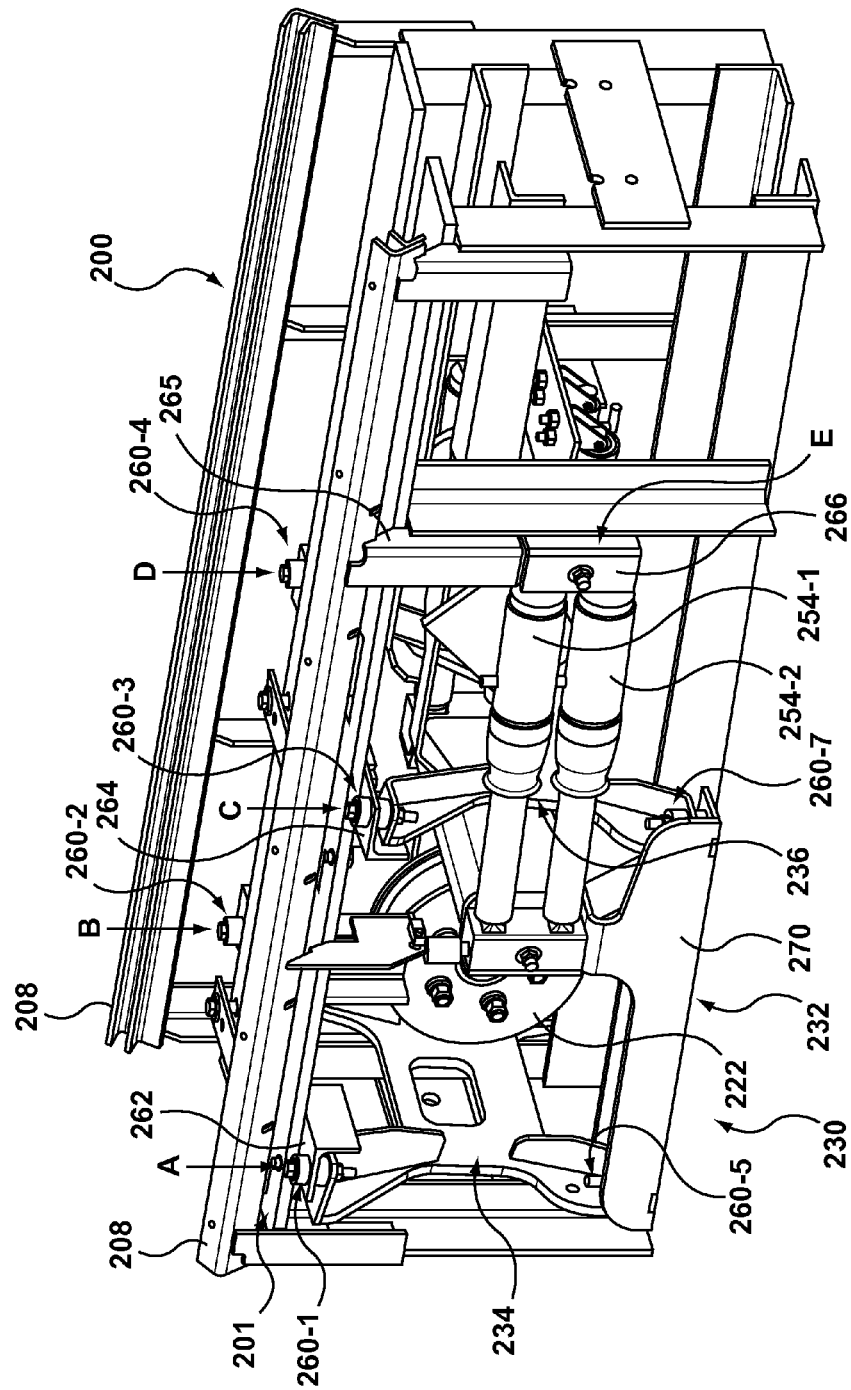
FIG. 7 is a perspective view of a portion of the conveyor of FIG. 1 containing a take-up drum carriage assembly for tensioning an endless drive.

The take-up drum carriage assembly 230 is situated at the entrance end 204 of the conveyor, below track level. The take-up drum carriage assembly 230 is illustrated in greater detail in FIGS. 7-18. In particular, FIG. 7 is a perspective view the take-up drum carriage assembly 230 forming part of the conveyor 200; FIGS. 8-12 are various views of the take-up drum carriage assembly 230 shown in isolation from the conveyor 200 so that the features of the apparatus can be more easily seen; and FIG. 13-18 illustrate operation of the take-up drum carriage assembly 230.

Figure 8:
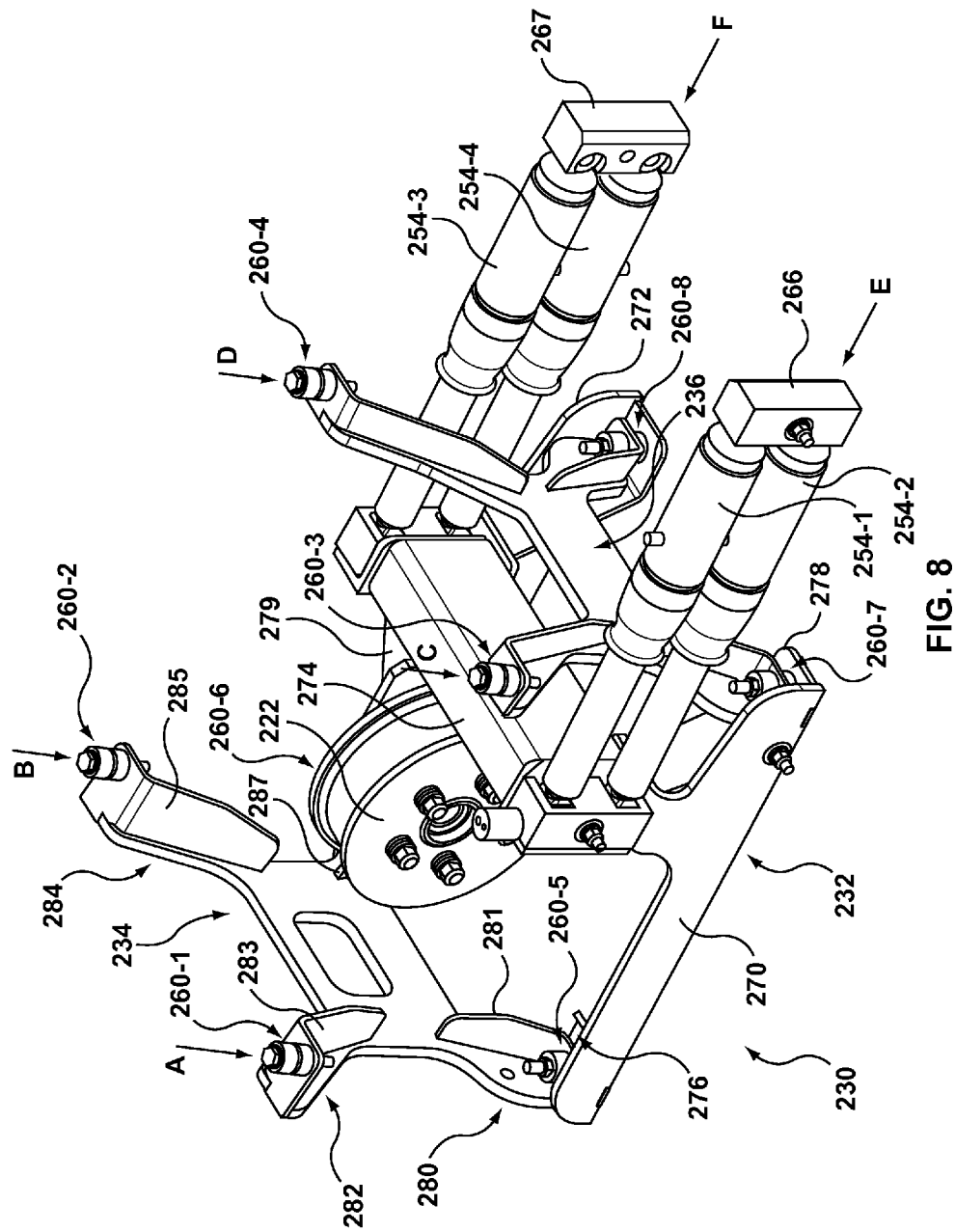
FIG. 8 is a perspective view of the take-up drum carriage assembly FIG. 7 in isolation from the conveyor of FIGS. 5 and 6.

Referring to FIGS. 7 and 8, it can be seen that the take-up drum carriage assembly 130 includes a carriage 232, a first pivot arm 234, and a second pivot arm 236. The carriage 232 carries the take-up drum 222, which is used for dynamic tensioning of the endless drive 220 (and may thus be referred to as a "tensioning take-up drum.") The pivot arms 234 and 236 suspend the carriage from the conveyor 200 so that the carriage 232 is swingable longitudinally relative to the conveyor 200. The pivot arms 234 and 236 thus act as swing arms in present embodiment and may be referred to as such in this description. For clarity, a swing arm is a form of pivot arm.

Swing arms 234, 236 are suspended from the frame of the conveyor 200. In particular, an upper portion of swing arm 234 is pivotably connected to a transverse member 262 of the conveyor 200 by a pair of interconnectors 260-1, 260-2 at interconnection points A and B respectively, and an upper portion of swing arm 236 is similarly pivotably connected to a transverse member 264 of the conveyor 200 by a pair of interconnectors 260-3, 260-4 at interconnection points C and D respectively. The transverse members 262, 264, which are angle iron in the present embodiment, are separated longitudinally from one another by a distance approximately equal to a longitudinal extent of the carriage 232. The transverse members 262, 264 may be considered as a part of the vehicle wash conveyor frame. The interconnectors 260-1, 260-2, 260-3 and 260-4 are described below in greater detail.

The swing arms 234, 236 are free to swing only longitudinally with respect to conveyor 200. Transverse swinging of the swing arms 234, 236 is inhibited by the use of two transversely-spaced interconnectors per swing arm and by the rigidity of the swing arms 234, 236 of the present embodiment. In particular, transverse swinging of the first swing arm 234 is inhibited by the transverse spacing between interconnectors 260-1, 260-2 that are used to suspend the rigid swing arm 234 from the transverse member 262, and transverse swinging of the second swing arm 236 is inhibited by the transverse spacing between interconnectors 260-3, 260-4 that are used to suspend the rigid swing arm 236 from the transverse member 264. This may help to maintain alignment of the take-up drum 222 with the endless drive 220 as the carriage 232 swings longitudinally.

A lower portion of each swing arm 234, 236 is connected to a respective end of the drum carriage 232 by a pair of interconnectors 260-5, 260-6 and 260-7, 260-8, respectively. The interconnectors 260-5, 260-6 and 260-7, 260-8 are of the same type as the interconnectors 260-1, 260-2, 260-3, 260-4, described in more detail below. The use of two transversely spaced interconnectors on each side of the carriage 232 renders each swing arm pivotable about an axis that is transverse to the drum carriage 232.

Collectively, the profile of the horizontal upper portion 201 of the conveyor 200, the suspended swing arms 234 and 236, and the carriage 232 can be considered to resemble a four-bar, or quadrilateral, linkage when viewed from the side. This is perhaps best seen in the side views of FIGS. 13 and 16, which show the carriage 232 swung rearwardly and forwardly (respectively). This structure of the take-up drum carriage assembly 230 may be referred to herein as a 3D quadrilateral linkage. The latter expression refers generally to a structure comprising two like quadrilateral linkages in parallel planes, with generally planar members joining corresponding members of the two linkages. This arrangement may maximize or extend a radius of an arc of travel of the take-up drum 222 as the carriage 232 swings longitudinally and thereby minimize or reduce a change of altitude of the take-up drum within the conveyor frame. In use, the motion of the carriage assembly 230 might be compared to that of a glider-type rocking chair.

It can be seen that the take-up drum carriage assembly 230 maintains the carriage 232 in a horizontal, or substantially horizontal, orientation in this embodiment as the carriage 232 swings longitudinally. This is in view of the fact that the carriage 232, swing arms 234, 236 and overhead portion of the conveyor frame have a rectangular profile when viewed from the side, such that the swing arms 234, 236 remain parallel as the carriage 232 swings. Put another way, in this embodiment, the vertical extent of the swing arms 234, 236 is substantially the same, and the longitudinal separately between each pair of longitudinally opposing interconnectors 260-1 and 260-3, 260-2 and 260-4, 260-5 and 260-7, and 260-5 and 260-8 is substantially the same.

The carriage component 232 of the present embodiment is generally H-shaped, with a transverse member 274 interconnecting a pair of longitudinal members 270, 272 (see FIGS. 8-11). The transverse member 274 has a mounting bracket 279 attached thereto to which the take-up drum 222 is mounted (best seen in FIG. 9). Each longitudinal member 270, 272 has a horizontal flange at each end with a hole therethrough, which is used for pivotably interconnecting the ends to swing arms 234 and 236 respectively using interconnectors 260 (described below). For example, referring to FIG. 8, longitudinal member 270 has a horizontal flange 276 at one end with a hole therethrough and a horizontal flange 278 at the other end, also with a hole therethrough. The other longitudinal member 272 has similar horizontal flanges at its ends with holes therethrough. The carriage 232 may have different shapes in alternative embodiments (e.g. it may be a simple platform or be X-shaped, to name but two examples).

The first swing arm 234 of the present embodiment is generally X-shaped with four wings 280, 282, 284 and 286. Three of the wings 280, 282 and 284 are visible in FIG. 8; the fourth wing is visible in FIG. 9. The open areas between the two upper wings 280, 282 and the two lower wings 284, 286 may accommodate the endless drive 220 and attached rollers 214 (see FIGS. 9 and 10).

Attached to each wing 280, 282, 284 and 286 is a respective angled rib 281, 283, 285 and 287 having a hockey stick shape (see FIG. 8). The ribs serve two purposes in the present embodiment. Firstly, they enhance the structural integrity of the swing arm 234. Secondly, the "blade portion" of the hockey stick provides a substantially horizontal (when the swing arm 234 is at vertical) planar section, with a hole therethrough, at the distal ends of the wings for pivotable interconnection of the swing arm 234 with either the carriage 232 or the frame of the conveyor 200, using interconnectors 260 (described below), to form the 3D quadrilateral linkage.

The structure of the second swing arm 236 is similar to that of the first swing arm 234. The shape of the swing arms may be designed to allow the rollers 214 that are attached to the moving endless drive 220 to be able to clear the swing arms 234, 236 not only as the rollers 214 travel to/from the take-up drum 22, but also as they rollers travel around the take-up drum 222. The swing arms 234, 236 do not necessarily have an X-shape in all embodiments. They may for example be rectangular, square or may have virtually any other shape that does not interfere with other components.

Figure 12:
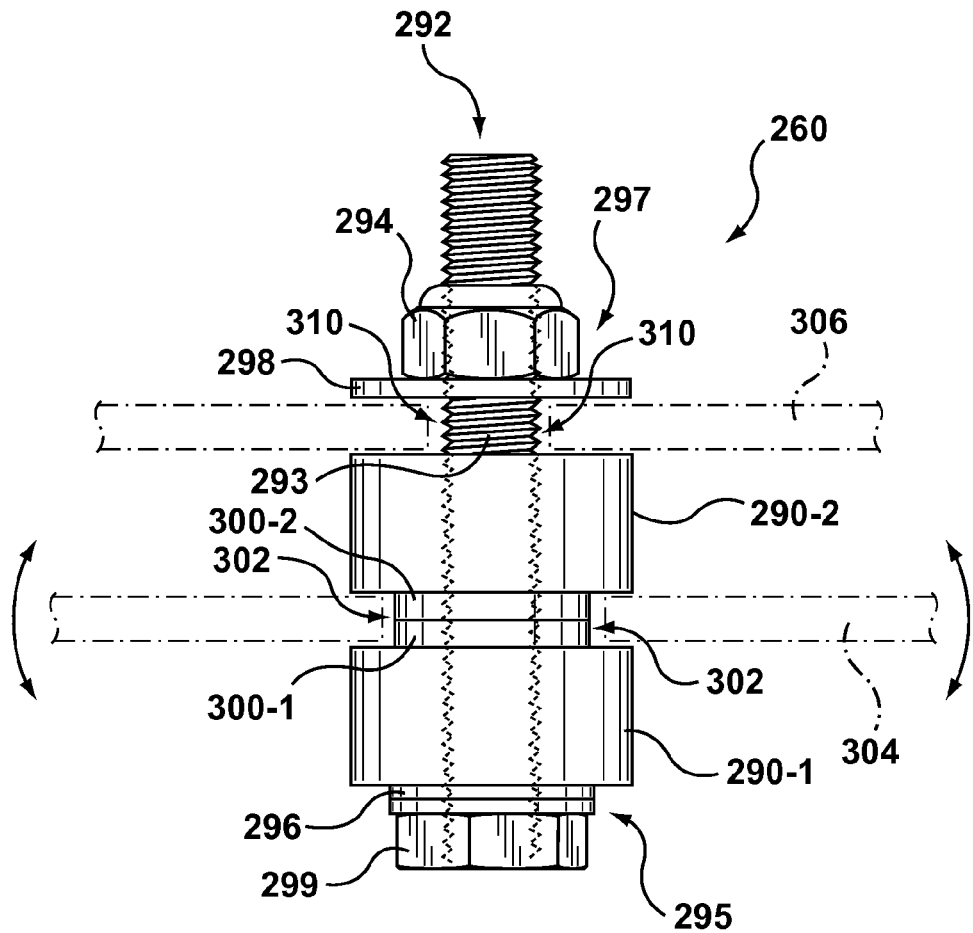
FIG. 12 is a side elevation view of one of the interconnectors used in the take-up drum carriage assembly of FIGS. 8-11.

An example interconnector 260 is illustrated in detail in FIG. 12. The interconnector 260 includes a fastener 292 and a pair of like resilient members 290-1, 290-2, which are referred to generically and collectively as resilient member(s) 290.

The fastener 292 has a shaft 293 and two ends 295, 297 that are wider than the shaft. In the present embodiment, the fastener 292 is a nut and bolt, the first end 295 is the head 299 of the bolt together with a washer 296, and the second end 297 is a nut 294 and washer 298. The fasteners used in other embodiments may differ (e.g. the fastener may be something other than a bolt, such as a rivet, may omit washers, etc.). One of the ends 297 may be removable to facilitate assembly or use of the interconnector 260. The shaft may or may not be threaded.

Figure 12A:
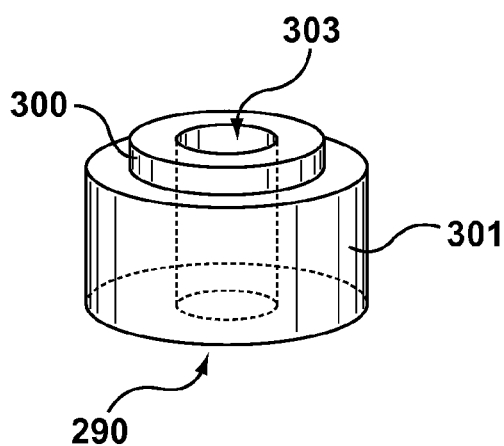
FIG. 12A is a perspective view of a resilient member forming part of the interconnector of FIG. 12.

In the present embodiment, each resilient member 290 is a resilient annular suspension link. The suspension link is made from a resilient material such as rubber or polyurethane for example. Referring to FIG. 12A, the resilient member 290 can be seen to have a body portion 301 and a narrower neck portion 300. A hole 303 for receiving the shaft 293 of the fastener 292 extends through the body and neck portions 301 and 300 of the resilient member 290. The neck portion 300 is intended to be seated in a hole in a part that is being interconnected by the interconnector 292.

When the interconnector 260 is assembled as shown in FIG. 12, the shaft portion 293 of the fastener 292 passes through the first washer 296, the hole 303 of first resilient members 290-1, the hole 303 of the second resilient member 290-2, the second washer 298, and the nut 294, in that order. The size of the holes 303 in the resilient members 290-1, 290-2 may be sufficiently large relative to the shaft 293 to allow the resilient members 290-1, 290-2 to easily slide along the length of the shaft 293 during installation.

The resilient members 290-1, 290-2 are arranged on the shaft of fastener 292 in mirror image, so that the neck portions 300-1, 300-2 face one another. This is so that the neck portions 300-1, 300-2 can be received within opposite sides of a hole 302 through a first component 304 that is to be pivotably attached to a second component 306. The neck portions help to seat the resilient members 290-1, 290-3 within the hole 302. The neck portions 300 also act as spacers between the edges of the hole 302 in which the neck portions 300 are seated and the shaft 293 of the fastener 292 extending through the hole 303 through the resilient members 290. In this regard, the neck portions 300 effectively center the shaft 293 within the hole 302 and cushion the shaft 293 from impacting the edges of the hole 302. This may reduce the likelihood of excessive wear of the shaft 293 or of the component 304 at the periphery of the hole 302.

The shaft of the bolt 292 also passes through a hole 310 in the second component 306. The nut 294 may be tightened so that the planar section 306 is sandwiched between the second resilient member 290-2 and the washer 298, and so that the planar section 304 of the first component is sandwiched between the resilient members 290-1, 290-2. Depending upon the thickness of the planar section 304 of the first component, the neck portions 300-1, 300-2 may or may not be in abutment with one another within the hole 302 when nut 294 has been so tightened.

The interconnector 260 allows the first component to be pivoted with respect to the fastener 292 and with respect to the second component 306 (pivoting being denoted by the curved arrows in FIG. 12). Pivoting is possible because the resilient members 290-1, 290-2 sandwiching the portion 304 of the first component are made from a resilient material that can be deformed. The rigid washer 298 discourages any similar pivoting of the second component with respect to the fastener 292, although a minimal pivoting of that type may be possible in some embodiments. If it is possible, then the degree of pivoting of the second component with respect to the bolt 292 will be significantly less than that of the first component in relation to the bolt 292.

It will be appreciated that a single interconnector 260 could feasibly be used to pivotably interconnect adjacent parts with two degrees of freedom (i.e. to permit pivoting side-to-side as well as front-to-back). In the present embodiment, pivoting of adjacent parts that are interconnected using interconnectors 260 is constrained to only one degree of freedom (longitudinally with respect to the conveyor 200) by the use of spaced-apart pairs of interconnectors 260 along the transverse edges of rigid adjacent components, as described above.

It will be appreciated that the interconnector 260 could alternatively be arranged in such a way that the second component 306 is positioned between the resilient member 290-1 and the first end 295 of the fastener, rather than being between the resilient member 290-2 and the second end 297 of the fastener as in FIG. 12. In that case, the first component 304 will still be pivotable, and the second component 306 will still be discouraged from pivoting. The operation of the interconnector 260 does not vary in any significant way as between these two arrangements. The choice of which arrangement to use may depend upon the specific dimensions of the components being pivotably connected, different degrees of accessibility of the opposite sides of the components being pivotably connected, or other factors.

It should be appreciated that, when the interconnector 260 is in use, one of the resilient members 290-1, 290-2 will act as a resilient support, and the other will act as a resilient spacer. The resilient support will serve the role of supporting at least part of the weight of a suspended part, and the spacer will serve the role of spacing adjacent pivoting parts from one another. Each resilient member 290-1, 290-2 can act in either capacity, depending upon how the arrangement of the interconnector 260 and how it is installed. This will be further illustrated below.

It will be appreciated that each of the interconnectors 260 of the present embodiment bears the weight of suspended parts primarily along a longitudinal axis of the fasteners 292 comprising the interconnectors (i.e. along the length of shafts 293). This is due to the primarily vertical orientation of the fasteners within the take-up drum carriage assembly 230.

In the example embodiment, four gas springs 254-1, 254-2, 254-3 and 254-4 (see e.g. FIG. 8), which may be referred to generically or collectively as gas spring(s) 254, are used bias the drum carriage 232 relative to the conveyor 200 for tensioning the endless drive 220. In the present embodiment, the direction of biasing is away from the driving sprocket at the exit end 206 of the conveyor 200 and towards the entrance end 204 (see, e.g., FIGS. 6 and 10). A first pair 254-1, 254-2 of gas springs is used on one side of the conveyor 200 and another pair 254-3, 254-4 of gas springs is used on the other side of the conveyor. A bracket 266 attached to one end of the first pair of springs 254-1, 254-2 constitutes a point of attachment E (FIG. 8) to the conveyor 200. The bracket 266 is attached to a vertical member 265 of the conveyor 200 (FIG. 7). A similar bracket 267 attached at the end of the second pair of springs 254-3, 254-4 constitutes another point of attachment F (FIG. 8) to the conveyor 200 (the attachment not being expressly visible in FIG. 7).

Figure 13:
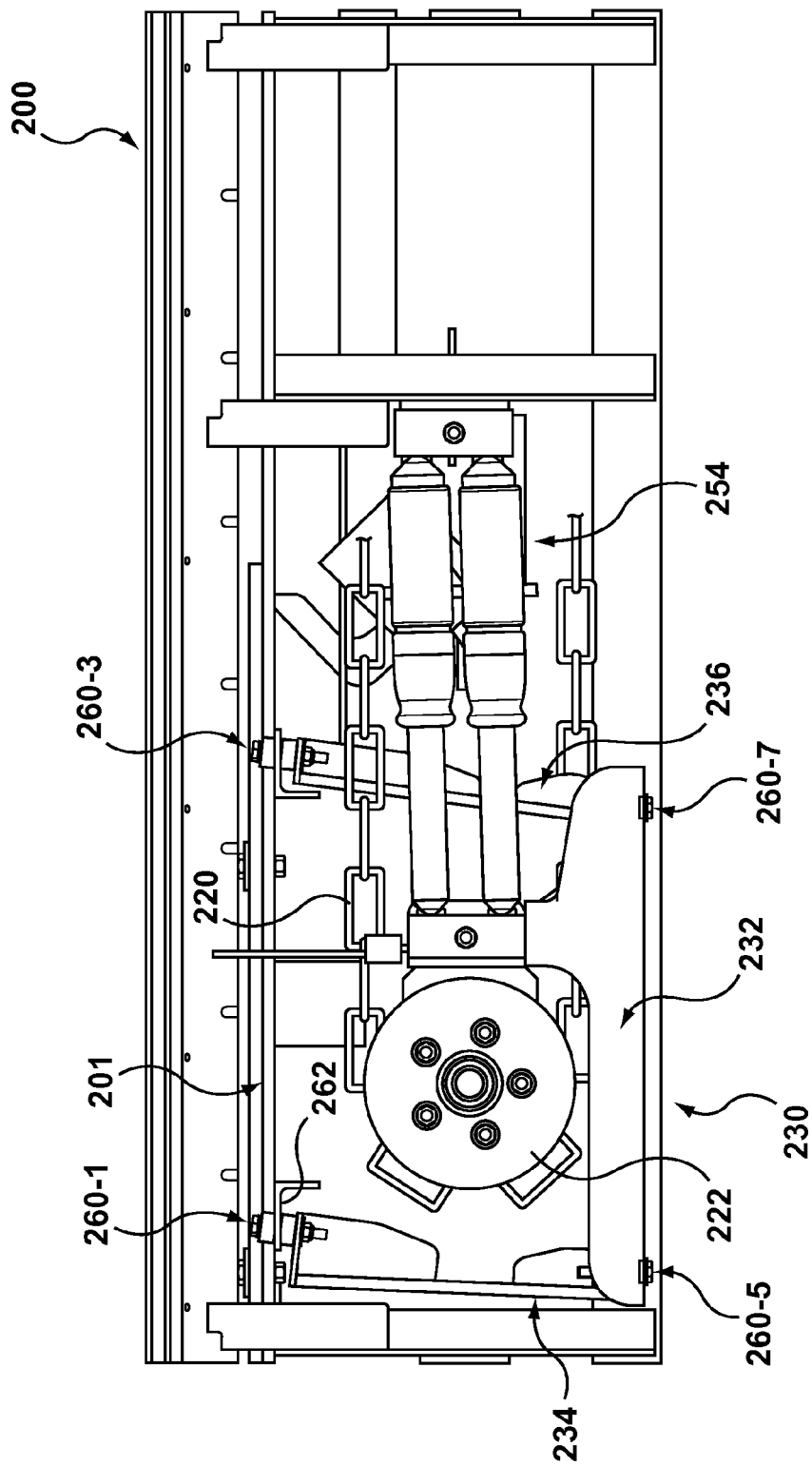
FIG. 13 is a side elevation view of a portion of the conveyor of FIG. 5 showing a take-up drum carriage assembly during operation.
Figure 15:
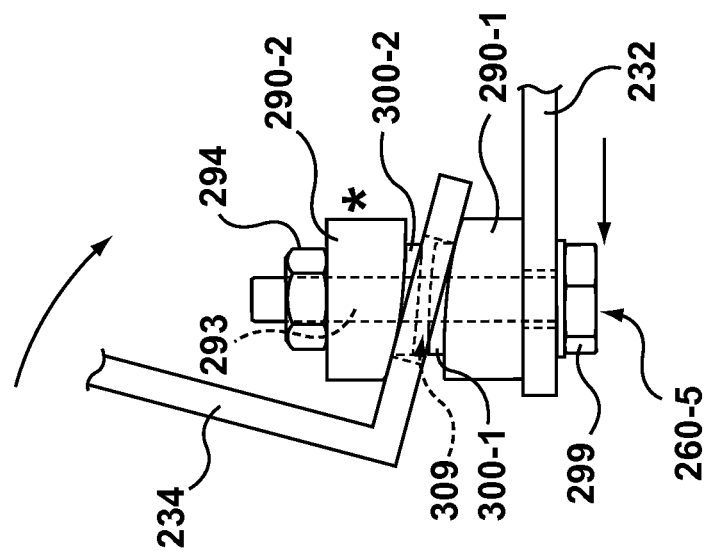
FIGS. 14 and 15 are close-up side elevation views of interconnectors used in conjunction with the take-up drum carriage assembly shown in FIG. 13.
Figure 14:
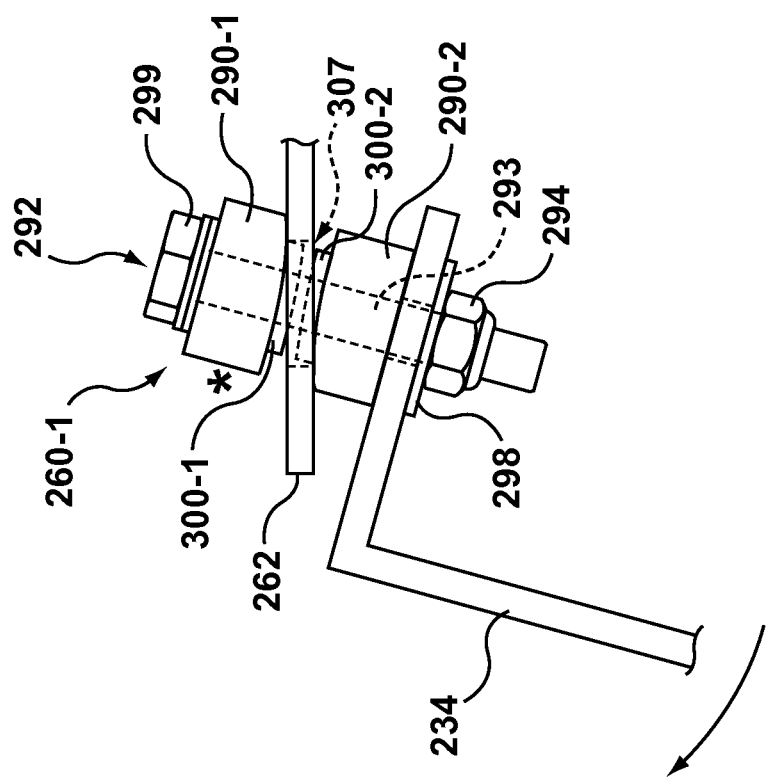
Figure 16:
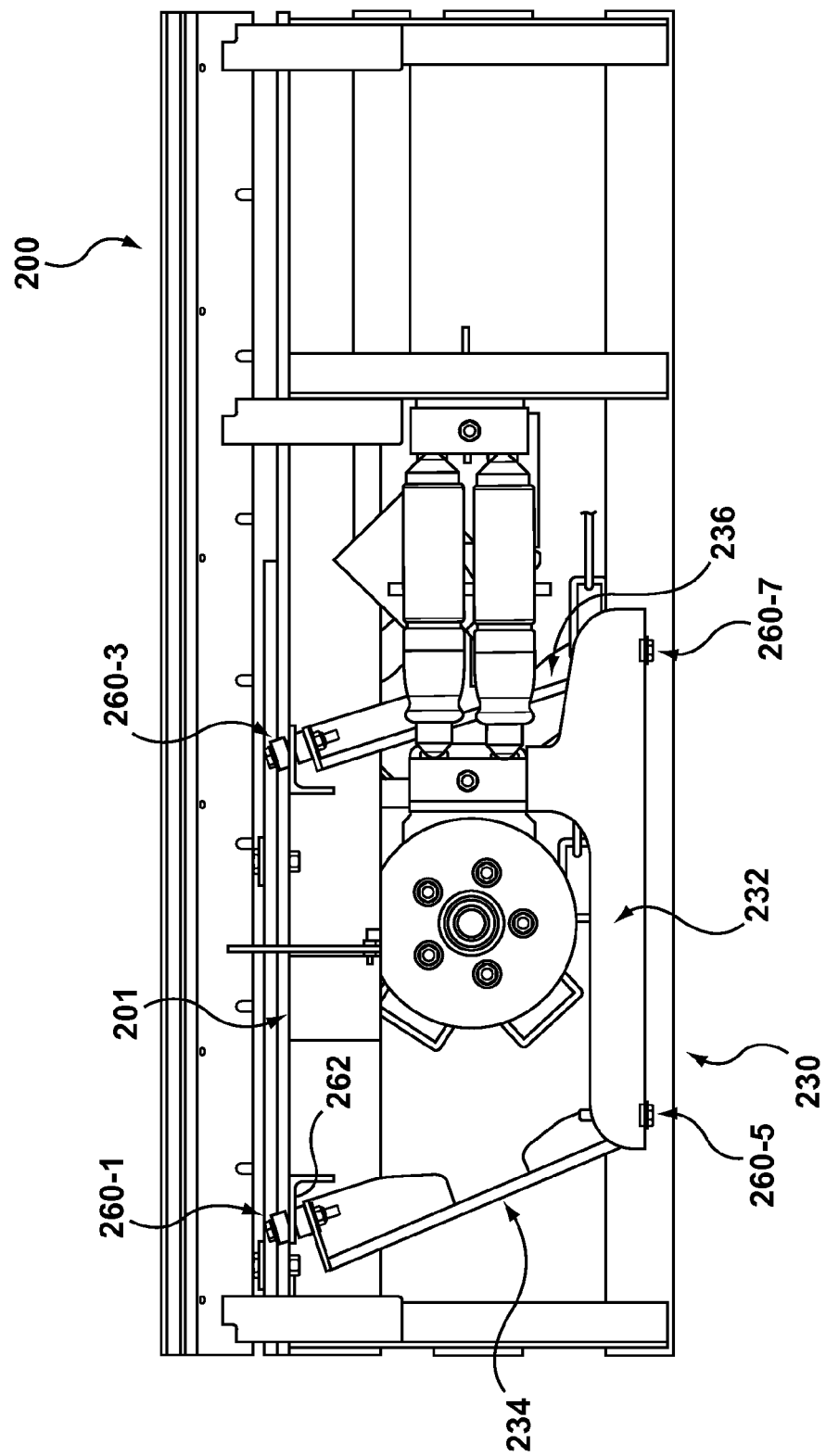
FIG. 16 is a side elevation view of a portion of the conveyor of FIG. 5 showing a take-up drum carriage assembly during operation.

Operation of the take-up drum carriage assembly 230 during tensioning of the endless drive 220 is illustrated in FIGS. 13-18. FIGS. 13-15 illustrate operation for increasing tension (taking up slack) in the endless drive. FIGS. 16-18 illustrate operation for reducing tension in the endless drive.

Referring to FIG. 13, when endless drive 220 slackens, e.g. due to lengthening of the endless drive 220 over its usable lifetime, the gas springs 254 automatically extend so as to swing the carriage 232, on swing arms 234, 236, away from the sprocket (i.e. away from the exit end 206 of the conveyor of FIG. 6) in order to take up the slack. As the swing arms 234, 236 swing, they pivot relative to both the frame of conveyor 200 and with respect to the carriage 232.

FIG. 14 illustrates the operation of one of the interconnectors 260 used to suspend one of the swing arms from the conveyor 200 during the swinging motion of FIG. 13. In particular, FIG. 14 is a side elevation view illustrating the interconnector 260-1 during pivoting of swing arm 234 relative to conveyor 200. The other interconnector 260-2 used to suspend the same swing arm 234 from the conveyor 200, and the two interconnectors 260-3 and 260-4 that are used to suspend the other swing arm 236 from the conveyor 200, operate in a similar manner.

As illustrated in FIG. 14, the interconnector 260-1 interconnects a substantially horizontal portion of swing arm 234 to transverse member 262 forming part of the frame of conveyor 200. The transverse member 262 is sandwiched between the two resilient members 290-1 and 290-2. The neck portions 300-1, 300-2 of the resilient members 290-1, 290-2 are seated within a hole 307 through the transverse member 262. This effectively spaces the shaft 293 of the fastener 292 extending through both resilient members 290 and both parts 234, 232 from the periphery of the hole.

Part of the weight of the swing arm 234 (specifically, the part that is not being supported by the other interconnector 260-2) is supported by the first resilient member 290-1. The first resilient member 290-1 thus acts as a resilient support in the configuration of FIG. 14. This is denoted in FIG. 14 by an asterisk ("*") label applied to resilient member 290-1. This label identifies resilient members that are acting as resilient supports. (The same convention is used in FIGS. 15, 17 and 18, described below.)

The other resilient member 290-2 of FIG. 14 does not serve as a support but merely as a resilient spacer between the swing arm 234 and the transverse member 262. The latter resilient member 290 is therefore not labelled with an asterisk.

It will be appreciated that both resilient members 290-1, 290-2 (including the resilient member 290-1 acting as a resilient support) are in fixed relation to the swing arm 234. The fixed relation may result from one or more of: the shaft 293 of the fastener 292 passing through both the resilient member and the part with respect to which the resilient member is being fixed; the seating of a portion (e.g. neck portion) of the resilient member in a hole in the part to which the resilient member is being fixed; the tightening of an end of the fastener (e.g. nut 294 and washer 298 threaded onto shaft 293 of fastener 292) relative to the resilient member and the part, which may encourage the fastener and thus the resilient member to stay in a particular position relative to the part (e.g. may encourage the shaft 293 of fastener 292 to extend orthogonally from the horizontal portion of swing arm 234). Other fixing mechanisms or means, such as an adhesive, may also be possible in other embodiments. Depending upon the fixing mechanism(s) that is (are) employed, some minor degree of movement of a fixed resilient support relative to the part to which it is fixed may be possible (e.g. if the resilient member has a neck portion, the neck portion may shift side to side within a hole within which it is seated if the diameter of the hole is larger than that of the neck). The fixed relation is preserved even as the swing arm pivots relative to the transverse member 262, as shown in FIG. 14.

In view of the fixed relation between the resilient support 290-1 (i.e. resilient member 290-1 in its role as a resilient support) and the swing arm 234, the resilient support 290-1 rocks relative to, and against, stationary transverse member 262 as the swing arm 234 swings (pivots). A lower right side of the resilient member 290-1 may deform slightly in view of the supported weight. The upper left side of the resilient member 290-2 that acts as a spacer may also deform slightly. Depending upon the hardness of the resilient members 290-1 and 290-2, the degree of deformation may vary, some embodiments possibly experiencing no noticeable deformation.

FIG. 15 illustrates the operation of one of the interconnectors 260 used to suspend the carriage 232 from a swing arm during the swinging motion of FIG. 13. In particular, FIG. 15 is a side elevation view illustrating the interconnector 260-5 during pivoting of swing arm 234 relative to carriage 232. The other interconnector 260-6 used to suspend the carriage 232 from the same swing arm 234, and the two interconnectors 260-7 and 260-8 that are used to suspend the other side of the carriage 232 from the other swing arm 236, operate in a similar manner.

As illustrated in FIG. 15, the interconnector 260-5 interconnects a substantially horizontal portion of swing arm 234 with the carriage 232. The swing arm 234 is sandwiched between the two resilient members 290-1 and 290-2 of the interconnector 260-5. The neck portions 300-1, 300-2 of the resilient members 290-1, 290-2 are seated within a hole 309 through the swing arm 234. This effectively spaces the shaft 293 of the fastener 292 extending through both resilient members 290 and both parts 234, 232 from the periphery of the hole.

Part of the weight of the carriage 232 (specifically, the part that is not being supported by any of the other interconnectors 260-6, 260-7 and 260-8) is supported by the second resilient member 290-2, which acts as a resilient support in this configuration of FIG. 15, as denoted by the asterisk ("*") label applied to resilient member 290-2 of FIG. 15. The other resilient member 290-2 acts as a resilient spacer between the swing arm 234 and the carriage 232.

Both resilient members 290-1, 290-2 of interconnector 260-5 are in fixed relation to carriage 232 (not to the swing arm 234 as in FIG. 14). The fixed relation is achieved in the present embodiment through cooperation between the nut 294 and washer 298 threaded onto shaft 293 of fastener 292, which are tightened so that shaft 293 extends orthogonally from the carriage 232. The fixed relation is preserved even as the swing arm pivots relative to the carriage 232, as shown in FIG. 14.

In view of the fixed relation between the resilient support 290-2 and the carriage 232, the resilient support 290-2 rocks relative to, and against, swing arm 234 as the swing arm 234 swings (pivots). In this case, the relative rocking motion results when the horizontal portion of the swing arm 234 rocks underneath the resilient support 290-2. This is unlike the relative rocking motion between the other end of the swing arm 234 and the resilient support 290-1 of interconnector 260-1, wherein the resilient support rocked atop the stationary transverse member 262.

Referring to FIG. 15, a lower left side of the resilient member 290-2 may deform slightly in view of the supported weight. The upper right side of the resilient member 290-1 that acts as a spacer may also deform slightly. Depending upon the hardness of the resilient members 290-1 and 290-2, the degree of deformation may vary, some embodiments possibly experiencing no noticeable deformation.

Referring to FIG. 16, when the endless drive 220 tightens such that the biasing force of the gas springs 254 is exceeded, e.g. due to sudden increased loading of the forward-moving portion of the endless drive 220 when a roller 214 engages a vehicle tire entering the conveyor 200 (see FIGS. 5 and 6), the gas springs 254 compress and the carriage 232 swings in the opposite direction, i.e. towards the sprocket, to reduce the tension on the endless drive 222. As the swing arms 234, 236 swing, they pivot relative to both the frame of conveyor 200 and with respect to the carriage 232.

FIG. 17 illustrates the operation of one of the interconnectors 260 used to suspend one of the swing arms from the conveyor 200 during the swinging motion of FIG. 16. In particular, FIG. 17 is a side elevation view illustrating the interconnector 260-1 during pivoting of swing arm 234 relative to conveyor 200. The other interconnector 260-2 used to suspend the same swing arm 234 from the conveyor 200, and the two interconnectors 260-3 and 260-4 that are used to suspend the other swing arm 236 from the conveyor 200, operate in a similar manner.

In view of the fixed relation between the resilient support 290-1 and the swing arm 234 of FIG. 17, the resilient support 290-1 rocks relative to, and against, stationary transverse member 262 as the swing arm 234 swings (pivots). The direction of rocking is opposite to that of FIG. 14. As such, a lower left side of the resilient member 290-1 may deform slightly in view of the supported weight. The upper right side of the resilient member 290-2 that acts as a spacer may also deform slightly.

FIG. 18 illustrates the operation of interconnector 260-5 during pivoting of swing arm 234 relative to carriage 232 as in FIG. 16, i.e. in the opposite direction to that shown in FIG. 15. The other interconnector 260-6 used to suspend the carriage 232 from the same swing arm 234, and the two interconnectors 260-7 and 260-8 that are used to suspend the other side of the carriage 232 from the other swing arm 236, operate in a similar manner.

In view of the fixed relation between the resilient support 290-2 and the carriage 232, the resilient support 290-2 rocks relative to, and against, swing arm 234 as the swing arm 234 swings (pivots). The rocking motion is in the opposite direction to what is shown in FIG. 15. A lower right side of the resilient member 290-2 may deform slightly in view of the supported weight. The upper right side of the resilient member 290-1 that acts as a spacer may also deform slightly.

As should be apparent from FIGS. 13-18 and the accompanying description, use of the interconnectors 260 for pivotably interconnecting adjacent parts forming the take-up drum carriage assembly 230 as described above may lessen maintenance demands upon operators of the conveyor 200. One reason is that, because adjacent moving parts of the take-up drum carriage do not slide against one another as in conveyor 100, but instead rock upon resilient supports, the degree of wear may be significantly diminished, even in the presence of grit or debris. This may avoid or at least defer the need to replace parts due to wear. Moreover, there may be little or no need to regularly grease or lubricate the pivot points. This may reduce operator demands and/or conveyor down time. At least some of these benefits may be difficult to achieve using other mechanisms for pivotably connecting two adjacent parts, such as hinges or rotatable pivot pins, which involve rotating movement between pivoting parts.

It will be appreciated that the above-illustrated embodiments are illustrative only and that various alternative embodiments could be effected.

In one alternative, the take-up drum carriage assembly need not necessarily be situated at an entrance end of a conveyor. The take-up drum carriage assembly could instead be situated elsewhere, e.g. at an exit end of the conveyor.

The endless drive need not necessarily be a chain. Another type of endless drive, such as a belt or other type of drive, could be used.

The biasing elements used to bias the take-up drum carriage assembly for tensioning purposes need not be as depicted in FIGS. 7 and 8. A different number of gas springs could be used. Alternatively, biasing elements may be something other than gas springs, such as other types of springs (e.g. coil or leaf springs) or an elastomer. The biasing force may be a "pushing" force (e.g. from a compressed spring) or a "pulling" force (e.g. extended spring pulling to contract).

The resilient members need not necessarily be as depicted in FIG. 12A and may be made from materials other than rubber or polyurethane. In alternative embodiments, resilient members may have other shapes. Some resilient members may lack a neck portion.

In some embodiments, it may be possible to use an interconnector with only a single resilient member acting as a resilient support. It may not be necessary to use a second resilient member as a resilient spacer. For example, in some embodiments, the resilient members 290-2 in FIGS. 14 and 17, and the resilient members 290-1 in FIGS. 15 and 18, could be omitted or may be considered optional.

In some embodiments, the interconnector used to attach a swing arm to the conveyor 200, such as the interconnector 260-1 shown in FIG. 14, could be attached so that the resilient members 290-1, 290-2 are in fixed relation to the conveyor 200 rather than to the swing arm 234. For example, referring to FIG. 14, the transverse member 262 could be between the head 299 of the bolt and the first resilient member 290-1 instead of being sandwiched between the resilient members 290-1 and 290-2, and the horizontal portion of the swing arm 234 could be sandwiched between the resilient members 290-1 and 290-2 instead of between resilient member 290-2 and nut 294. In that case, the bolt 292 may remain substantially vertical as the swing arm 234 swings. The lower resilient member 290-2 would act as the resilient support rather than upper member 290-1, and the upper resilient member 290-1 would act as the resilient spacer rather than the lower member 290-2.

Analogously, in some embodiments, the interconnector used to attach a swing arm to the carriage, such as the interconnector 260-5 shown in FIG. 15, could be attached so that the resilient members 290-1, 290-2 are in fixed relation to the swing arm rather than to the carriage. For example, referring to FIG. 15, the horizontal portion of swing arm 234 could be between the nut 294 and the resilient member 290-2 instead of being sandwiched between the resilient members 290-1 and 290-2, and the carriage could be sandwiched between the resilient members 290-1 and 290-2 instead of between resilient member 290-1 and bolt head 299. In that case, the bolt 292 may pivot with the swing arm 234 as the swing arm 234 swings. The lower resilient member 290-1 would act as the resilient support rather than upper member 290-2, and the upper resilient member 290-2 would act as the resilient spacer rather than the lower member 290-1.

It is not absolutely necessary for the take-up drum carriage to be suspended from swing arms. In some embodiments, this arrangement may essentially be inverted, with the take-up drum carriage sitting atop rigid pivot arms that are longitudinally pivotable. In such embodiments, the carriage does not swing from the pivot arms but rather moves longitudinally back and forth atop the pivoting pivot arms. The same type of interconnectors may be used to interconnect the conveyor frame to each pivot arm and each pivot arm to the carriage.

Figure 19:
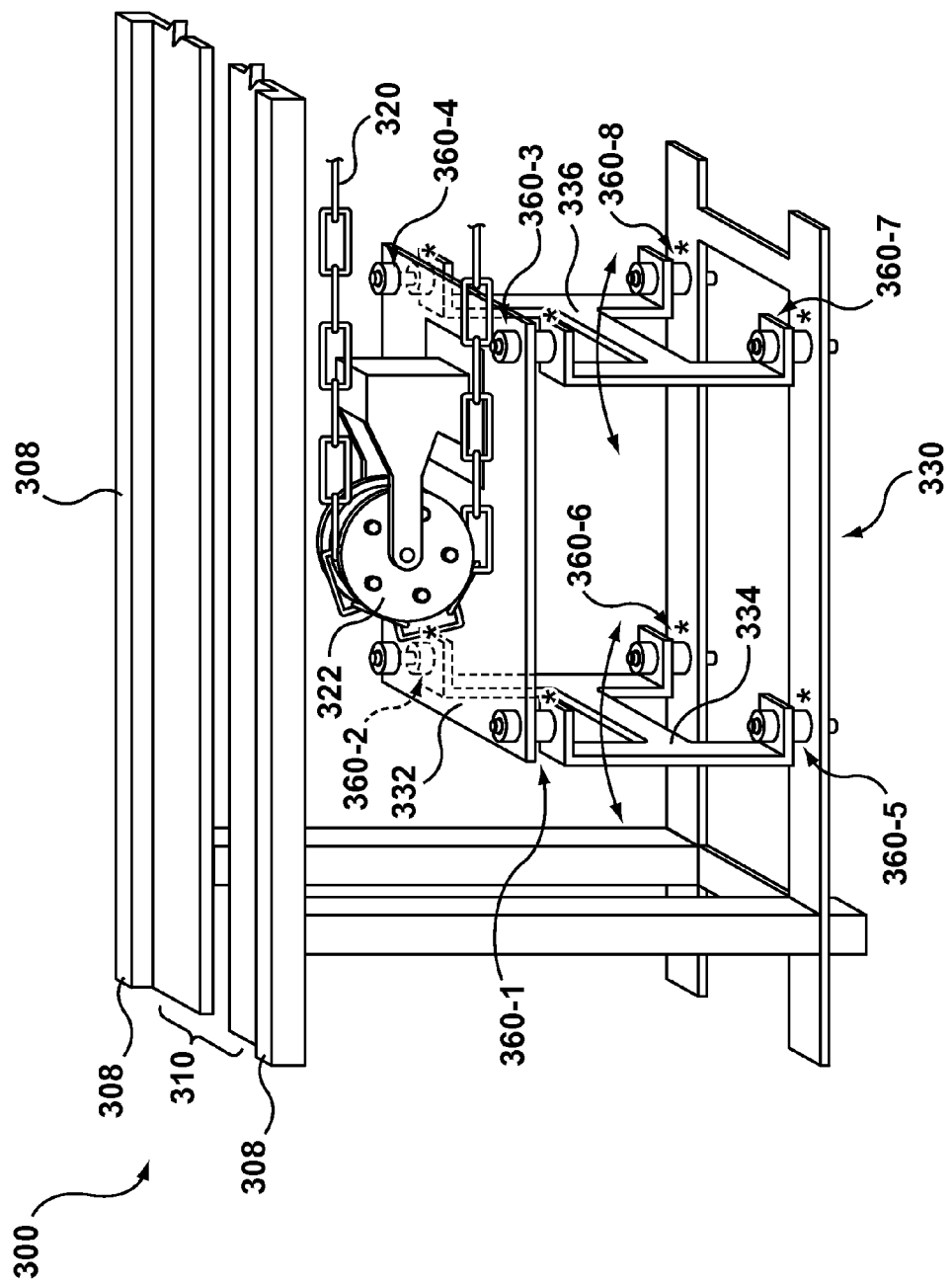
FIG. 19 illustrates an alternative embodiment of a take-up drum carriage assembly.

Such an alternative embodiment is illustrated in FIG. 19, which illustrates a portion of a conveyor 300 containing an alternative take-up drum carriage assembly 330 in perspective view. The conveyor 300 has a tire guides 308 and a slotted track analogous to the guide 208 and track 210, described above. The take-up drum carriage assembly 330 includes a tensioning take-up drum 322 mounted to a longitudinally movable carriage 332. The carriage 332 is biased, for tensioning purposes, away from a sprocket that drives an endless drive 320. The bias is provided by one or more biasing elements, such as gas springs, which are not expressly illustrated. Although the carriage 332 is illustrated as a flat platform in FIG. 19, it will be appreciated that the carriage may actually have an alternative shape designed to ensure clearance of the endless drive 320 and any rollers attached thereto. For example, the carriage 332 may be shaped similarly to carriage 232 of the above-described embodiment.

The assembly 330 also includes a pair of longitudinally spaced pivot arms 334, 336 that are pivotably interconnected, at their upper ends, to respective longitudinal ends of the carriage 332. The first pivot arm 334 is pivotably connected to the carriage 332 using a first pair of interconnectors 360-1, 360-2, and the second pivot arm 336 is pivotably connected to the carriage using a second pair of interconnectors 360-3, 360-4. The interconnectors are similar or identical to the interconnector 260 illustrated in FIG. 12. The pivot arms 334, 336 are longitudinally pivotable with respect to the carriage 332 but are not transversely pivotable with respect to the carriage 332.

Each pivot arm 334, 336 is also pivotably interconnected, at its lower end, to the lower portion of the conveyor 300. In particular, the first pivot arm 334 is pivotably connected to the lower portion of the conveyor using a first pair of interconnectors 360-5, 360-6, and the second pivot arm 336 is pivotably connected to the lower portion of the conveyor using a second pair of interconnectors 360-7, 360-8. These interconnectors are also similar or identical to the interconnector 260 illustrated in FIG. 12. The pivot arms 334, 336 are longitudinally pivotable with respect to the conveyor 300 but are not transversely pivotable with respect to the conveyor 300.

The frame of conveyor 300 may include stops or limits in this embodiment (not expressly illustrated) for preventing the carriage 332 from pivoting beyond past particular points on either longitudinal side of the carriage.

Other modifications will be apparent to those skilled in the art and, therefore, the invention is defined in the claims.

What is claimed is:

1. A take-up drum carriage assembly for facilitating tensioning of an endless drive of a vehicle wash conveyor, the take-up drum carriage assembly comprising:
   a tensioning take-up drum;
   a carriage for supporting the tensioning take-up drum;
   a plurality of swing arms for swingably suspending the carriage from a vehicle wash conveyor frame; and for each of the swing arms:
  at least one interconnector for pivotably interconnecting the swing arm and the carriage, each interconnector comprising a resilient support that supports at least part of the weight of the carriage, the interconnector fixing the resilient support relative to one of the swing arm and the carriage,
  wherein the other of the swing arm and the carriage rocks relative to, and against, the resilient support upon a swinging of the carriage relative to the vehicle wash conveyor frame during tensioning.

2. The take-up drum carriage assembly of claim 1 wherein each interconnector interconnecting one of the swing arms and the carriage further comprises a resilient spacer between the swing arm and the carriage.

3. The take-up drum carriage assembly of claim 2 wherein a portion of said one of the swing arms is sandwiched between the resilient support and the resilient spacer.

4. The take-up drum carriage assembly of claim 2 wherein a portion of the carriage is sandwiched between the resilient support and the resilient spacer.

5. The take-up drum carriage assembly of claim 1 wherein each interconnector comprises a fastener having a shaft and two ends wider than the shaft, wherein the resilient support, the swing arm and the carriage each have a hole therethrough, and wherein the shaft of the fastener extends through the holes in each of the resilient support, the swing arm and the carriage.

6. The take-up drum carriage assembly of claim 5 wherein the resilient support is situated between one of the ends of the fastener and the swing arm.

7. The take-up drum carriage assembly of claim 5 wherein the resilient support is situated between one of the ends the fastener and the carriage.

8. The take-up drum carriage assembly of claim 5 wherein each interconnector interconnecting one of the swing arms and the carriage further comprises a resilient spacer with a hole therethrough, the shaft of the fastener extending through the hole in the resilient spacer, the resilient spacer being situated between the swing arm and the carriage.

9. The take-up drum carriage assembly of claim 5 wherein the resilient support has a neck portion and a body portion, the neck portion being narrower than the body portion, and wherein the hole in the resilient support extends through the neck portion, such that, when the neck portion is seated either in the hole of the swing arm or in the hole of the carriage, the neck portion acts as a spacer between:
  the periphery of the hole in which the neck portion is seated; and
  the shaft of the fastener extending through the hole in the resilient support.

10. The take-up drum carriage assembly of claim 1 wherein the plurality of swing arms is a pair of swing arms, the first swing arm of the pair being pivotably connected to one end of the carriage, the second swing arm being pivotably connected to the other end of the carriage, such that the carriage maintains a substantially horizontal orientation upon a swinging of the carriage from the pair of swing arms.

11. A take-up drum carriage assembly for facilitating tensioning of an endless drive of a vehicle wash conveyor, the take-up drum carriage assembly comprising:
  a tensioning take-up drum;
  a carriage for supporting the tensioning take-up drum;
  a plurality of swing arms for swingably suspending the carriage from a vehicle wash conveyor frame; and
  for each of the swing arms:
    at least one interconnector for pivotably interconnecting the swing arm to the vehicle wash conveyor frame, each interconnector comprising a resilient support that supports at least part of the weight of the swing arm, the interconnector fixing the resilient support relative to one of the swing arm and the vehicle wash conveyor frame,
    wherein the resilient support rocks relative to and against the other of the swing arm and the vehicle wash conveyor frame upon swinging of the swing arm during tensioning.

12. The take-up drum carriage assembly of claim 11 wherein each interconnector interconnecting one of the swing arms to the vehicle wash conveyor further comprises a resilient spacer between the swing arm and the vehicle wash conveyor.

13. The take-up drum carriage assembly of claim 12 wherein a portion of said one of the swing arms is sandwiched between the resilient support and the resilient spacer.

14. The take-up drum carriage assembly of claim 12 wherein a portion of the vehicle wash conveyor frame is sandwiched between the resilient support and the resilient spacer.

15. The take-up drum carriage assembly of claim 11 wherein each interconnector comprises a fastener having a shaft and two ends wider than the shaft, wherein the resilient support, the swing arm and the carriage each have a hole therethrough, and wherein the shaft of the fastener extends through the holes in each of the resilient support, the swing arm and the vehicle wash conveyor frame.

16. The take-up drum carriage assembly of claim 15 wherein the resilient support is situated between one of the ends of the fastener and the swing arm.

17. The take-up drum carriage assembly of claim 15 wherein the resilient support is situated between one of the ends the fastener and the vehicle wash conveyor frame.

18. The take-up drum carriage assembly of claim 15 wherein each interconnector interconnecting one of the swing arms and the vehicle wash conveyor frame further comprises a resilient spacer with a hole therethrough, the shaft of the fastener extending through the hole in the resilient spacer, the resilient spacer being situated between the swing arm and the vehicle wash conveyor frame.

19. The take-up drum carriage assembly of claim 15 wherein the resilient support has a neck portion and a body portion, the neck portion being narrower than the body portion, and wherein the hole in the resilient support extends through the neck portion, such that, when the neck portion is seated either in the hole of the swing arm or in the hole of the vehicle wash conveyor frame, the neck portion acts as a spacer between:
  the periphery of the hole in which the neck portion is seated; and
  the shaft of the fastener extending through the hole in the resilient support.

20. The take-up drum carriage assembly of claim 11, wherein the at least one interconnector for pivotably interconnecting each swing arm to the vehicle wash conveyor frame comprises two interconnectors pivotably connecting the swing arm to the vehicle wash conveyor frame at two respective points on the vehicle wash conveyor frame that are transversely spaced apart from one another, such that each swing arm is swingable longitudinally with respect to the vehicle wash conveyor frame but is not swingable transversely with respect to the vehicle wash conveyor frame.

21. A take-up drum carriage assembly for facilitating tensioning of an endless drive of a vehicle wash conveyor, the take-up drum carriage assembly comprising:
a tensioning take-up drum;
a carriage for supporting the tensioning take-up drum;
a plurality of pivot arms for pivotably supporting the carriage relative to a vehicle wash conveyor frame; and
for each of the pivot arms:
at least one interconnector for pivotably interconnecting the pivot arm and the carriage, each interconnector comprising a resilient support that supports at least part of the weight of the carriage, the interconnector fixing the resilient support relative to one of the pivot arm and the carriage,
wherein the other of the pivot arm and the carriage rocks relative to, and against, the resilient support upon longitudinal movement of the carriage relative to the vehicle wash conveyor frame during tensioning.

22. The take-up drum carriage assembly of claim 21 wherein each interconnector interconnecting one of the pivot arms and the carriage further comprises a resilient spacer between the pivot arm and the carriage.

23. The take-up drum carriage assembly of claim 22 wherein a portion of said one of the pivot arms is sandwiched between the resilient support and the resilient spacer.

24. The take-up drum carriage assembly of claim 22 wherein a portion of the carriage is sandwiched between the resilient support and the resilient spacer.

25. The take-up drum carriage assembly of claim 21 wherein each interconnector comprises a fastener having a shaft and two ends wider than the shaft, wherein the resilient support, the pivot arm and the carriage each have a hole therethrough, and wherein the shaft of the fastener extends through the holes in each of the resilient support, the pivot arm and the carriage.

26. The take-up drum carriage assembly of claim 25 wherein the resilient support is situated between one of the ends of the fastener and the pivot arm.

27. The take-up drum carriage assembly of claim 25 wherein the resilient support is situated between one of the ends the fastener and the carriage.

28. The take-up drum carriage assembly of claim 25 wherein each interconnector interconnecting one of the pivot arms and the carriage further comprises a resilient spacer with a hole therethrough, the shaft of the fastener extending through the hole in the resilient spacer, the resilient spacer being situated between the pivot arm and the carriage.

29. The take-up drum carriage assembly of claim 25 wherein the resilient support has a neck portion and a body portion, the neck portion being narrower than the body portion, and wherein the hole in the resilient support extends through the neck portion, such that, when the neck portion is seated either in the hole of the pivot arm or in the hole of the carriage, the neck portion acts as a spacer between:
the periphery of the hole in which the neck portion is seated; and
the shaft of the fastener extending through the hole in the resilient support.

30. The take-up drum carriage assembly of claim 21 wherein the plurality of pivot arms is a pair of pivot arms, the first pivot arm of the pair being pivotably connected to one end of the carriage, the second pivot arm being pivotably connected to the other end of the carriage, such that the carriage maintains a substantially horizontal orientation upon a swinging of the carriage from the pair of pivot arms.

31. A take-up drum carriage assembly for facilitating tensioning of an endless drive of a vehicle wash conveyor, the take-up drum carriage assembly comprising:
a tensioning take-up drum;
a carriage for supporting the tensioning take-up drum;
a plurality of pivot arms for pivotably supporting the carriage relative to a vehicle wash conveyor frame; and
for each of the pivot arms:
at least one interconnector for pivotably interconnecting the pivot arm to the vehicle wash conveyor frame, each interconnector comprising a resilient support that supports at least part of the weight of the pivot arm, the interconnector fixing the resilient support relative to one of the pivot arm and the vehicle wash conveyor frame,
wherein the resilient support rocks relative to and against the other of the pivot arm and the vehicle wash conveyor frame upon pivoting of the pivot arm during tensioning.

32. The take-up drum carriage assembly of claim 31 wherein each interconnector interconnecting one of the pivot arms to the vehicle wash conveyor further comprises a resilient spacer between the pivot arm and the vehicle wash conveyor.

33. The take-up drum carriage assembly of claim 32 wherein a portion of said one of the pivot arms is sandwiched between the resilient support and the resilient spacer.

34. The take-up drum carriage assembly of claim 32 wherein a portion of the vehicle wash conveyor frame is sandwiched between the resilient support and the resilient spacer.

35. The take-up drum carriage assembly of claim 31 wherein each interconnector comprises a fastener having a shaft and two ends wider than the shaft, wherein the resilient support, the pivot arm and the carriage each have a hole therethrough, and wherein the shaft of the fastener extends through the holes in each of the resilient support, the pivot arm and the vehicle wash conveyor frame.

36. The take-up drum carriage assembly of claim 35 wherein the resilient support is situated between one of the ends of the fastener and the pivot arm.

37. The take-up drum carriage assembly of claim 35 wherein the resilient support is situated between one of the ends the fastener and the vehicle wash conveyor frame.

38. The take-up drum carriage assembly of claim 35 wherein each interconnector interconnecting one of the pivot arms and the vehicle wash conveyor frame further comprises a resilient spacer with a hole therethrough, the shaft of the fastener extending through the hole in the resilient spacer, the resilient spacer being situated between the pivot arm and the vehicle wash conveyor frame.

39. The take-up drum carriage assembly of claim 35 wherein the resilient support has a neck portion and a body portion, the neck portion being narrower than the body portion, and wherein the hole in the resilient support extends through the neck portion, such that, when the neck portion is seated either in the hole of the pivot arm or in the hole of the vehicle wash conveyor frame, the neck portion acts as a spacer between:
the periphery of the hole in which the neck portion is seated; and
the shaft of the fastener extending through the hole in the resilient support.

40. The take-up drum carriage assembly of claim 31, wherein the at least one interconnector for pivotably interconnecting each pivot arm to the vehicle wash conveyor frame comprises two interconnectors pivotably connecting the pivot arm to the vehicle wash conveyor frame at two respective points on the vehicle wash conveyor frame that are transversely spaced apart from one another, such that each pivot arm is swingable longitudinally with respect to the vehicle wash conveyor frame but is not swingable transversely with respect to the vehicle wash conveyor frame.

* * * * *